(12) United States Patent
Goodell et al.

(10) Patent No.: US 12,095,666 B1
(45) Date of Patent: Sep. 17, 2024

(54) EFFICIENT PROPAGATION OF ROUTING INFORMATION FOR COMPUTE INSTANCES WITH NETWORK ADDRESS RANGES OF MULTIPLE ADDRESS FAMILIES

(71) Applicant: Amazon Technologies, Inc., Seattle, WA (US)

(72) Inventors: David James Goodell, Seattle, WA (US); Ethan Joseph Torretta, Edmonds, WA (US); Bharadwaj Avva, Bothell, WA (US); Joseph Elmar Magerramov, Bellevue, WA (US); Shovan Kumar Das, Medina, WA (US)

(73) Assignee: Amazon Technologies, Inc., Seattle, WA (US)

( * ) Notice: Subject to any disclaimer, the term of this patent is extended or adjusted under 35 U.S.C. 154(b) by 537 days.

(21) Appl. No.: 17/491,263

(22) Filed: Sep. 30, 2021

(51) Int. Cl.
| | | |
|---|---|---|
| *H04L 45/741* | (2022.01) | |
| *H04L 12/46* | (2006.01) | |
| *H04L 45/02* | (2022.01) | |
| *H04L 45/745* | (2022.01) | |

(52) U.S. Cl.
CPC ........ *H04L 45/741* (2013.01); *H04L 12/4641* (2013.01); *H04L 45/04* (2013.01); *H04L 45/745* (2013.01)

(58) Field of Classification Search
CPC ... H04L 45/741; H04L 12/4641; H04L 45/04; H04L 45/745
See application file for complete search history.

(56) References Cited

U.S. PATENT DOCUMENTS

| | | |
|---|---|---|
| 8,127,003 B2 | 2/2012 | Glaeser et al. |
| 9,143,430 B2 | 9/2015 | Beshai et al. |
| 9,143,441 B2 | 9/2015 | Basso et al. |
| 9,270,592 B1 | 2/2016 | Sites |
| 9,497,113 B2 | 11/2016 | Dispensa et al. |
| 9,537,772 B2 | 1/2017 | Scott et al. |
| 9,722,922 B2 | 8/2017 | Kamath et al. |
| 9,948,557 B2 | 4/2018 | Fan et al. |
| 10,326,801 B2 | 6/2019 | Xu |
| 10,848,431 B2 | 11/2020 | Schultze et al. |

(Continued)

OTHER PUBLICATIONS

"Alias IP ranges overview," VPC, Google Cloud, https://cloud.google.vpc/docs/alias-ip, last updated Aug. 19, 2021, pp. 1-17 downloaded on Aug. 23, 2021.

(Continued)

*Primary Examiner* — Kibrom T Hailu
(74) *Attorney, Agent, or Firm* — Robert C. Kowert; Kowert, Hood, Munyon, Rankin & Goetzel, P.C.

(57) ABSTRACT

A first set of network addresses of a first address family, and a second set of network addresses of a second address family, are assigned to a virtual machine. At a routing device, respective routing information entries for the two sets of network addresses are stored, without storing routing information entries for individual addresses of the sets. A first packet with a destination address within the first set, routed using the routing information entry for the first set, is obtained at the virtual machine. A second packet with a destination address within the second set, routed using the routing information entry for the second set, is obtained at the virtual machine.

20 Claims, 16 Drawing Sheets

(56) References Cited

U.S. PATENT DOCUMENTS

2006/0268681 A1* 11/2006 Raza .................. H04L 45/02
                                               370/216
2017/0134340 A1*  5/2017 Janakiraman ......... H04L 12/462
2020/0014589 A1   1/2020 Xu et al.
2020/0092193 A1*  3/2020 Tillotson ........... G06F 16/24573

OTHER PUBLICATIONS

U.S. Appl. No. 17/491,287, filed Sep. 30, 2021, David James Goodell.

* cited by examiner

EFFICIENT PROPAGATION OF ROUTING INFORMATION FOR COMPUTE INSTANCES WITH NETWORK ADDRESS RANGES OF MULTIPLE ADDRESS FAMILIES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment. As demand for virtualization-based services at provider networks has grown, more and more networking and interconnectivity-related features, including support for multiple network addresses for a single virtual machine, may have to be added to meet the requirements of applications being implemented using the services.

Figure 1:
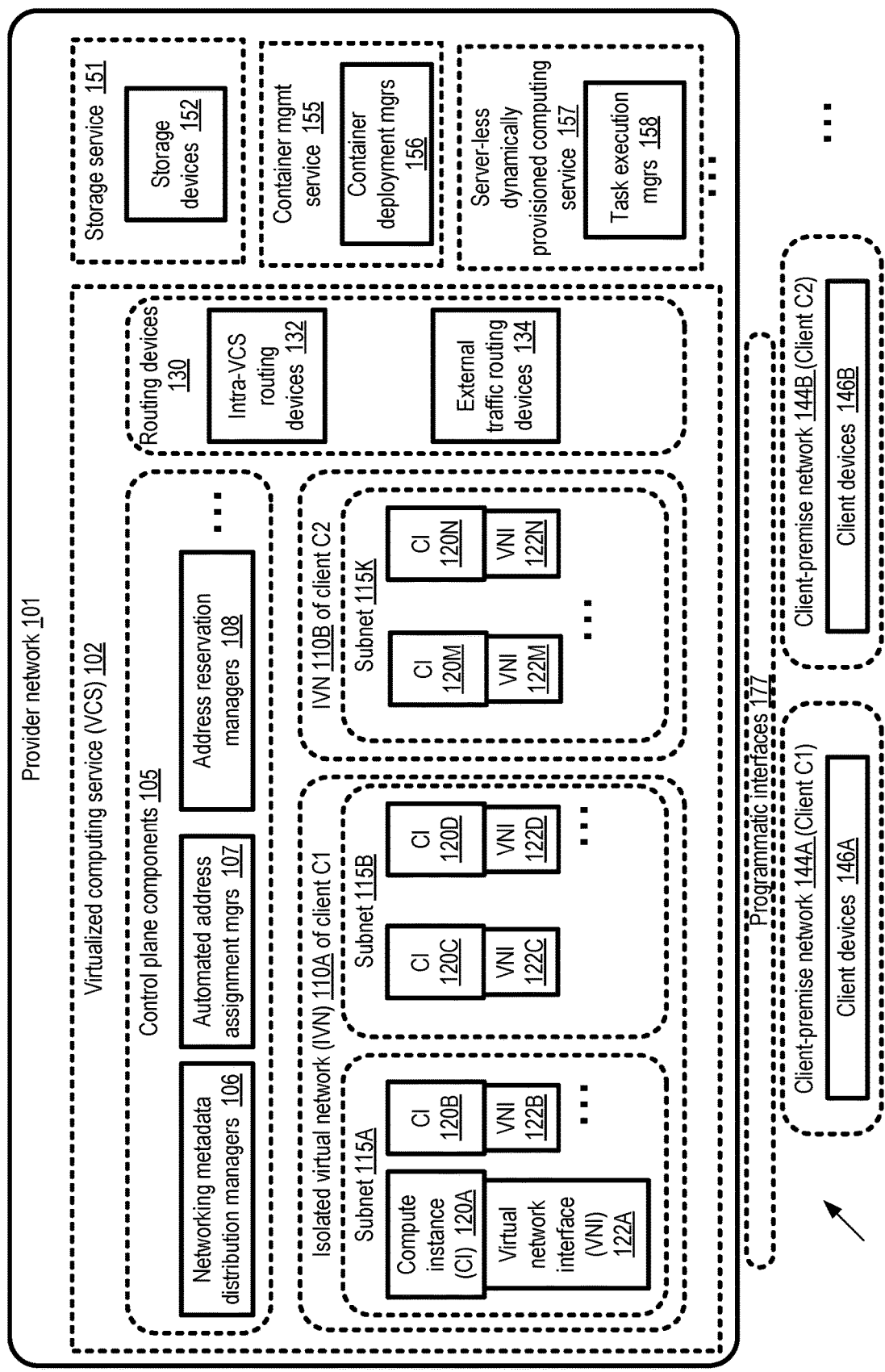
FIG. 1 illustrates an example system environment in which routing information pertaining to compute instances of a virtualized computing service to which ranges of network addresses within multiple address families are assigned may be distributed efficiently, and sub-ranges of address blocks of a given subnet configured at the virtualized computing service may be proactively reserved for client-specified usage categories, according to according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for the efficient propagation of routing information at a virtualized computing service of a cloud provider network at which individual compute instances may be assigned large numbers (e.g., millions) of network addresses of one or more address families. The disclosure also relates to methods and apparatus for enabling clients of the virtualized computing service to proactively reserve blocks (contiguous ranges) of network addresses for client-selected operation categories including such large-scale address assignments. Simple interfaces to manage network address ranges of Internet Protocol version 4 (IPv4) addresses and/or ranges of IP version 6 (IPv6) addresses, at the per-subnet level, as well as at the per-network-interface and per-compute instance level, are implemented. Routing information for directing network packets to a compute instance is distributed using a very small number of messages, even if the compute instance is assigned thousands or millions of addresses. Furthermore, the maximum number of lookups (within routing tables or other structures at edge routers and other networking infrastructure devices) that are required to forward such packets to the compute instance, e.g., is kept low, making routing much faster than in scenarios in which repeated lookups may be required to find the longest matching prefix for a destination address. Address range management techniques are tightly integrated with existing mechanisms for managing isolated virtual networks (IVNs) of the virtualized computing service (VCS)—for example, IVN network security rules (e.g., rules governing allowed types of incoming and outgoing traffic) can be specified at the granularity of address ranges if desired.

One or more IVNs can be set up on behalf of a client of the VCS, with each IVN comprising one or more compute instances (such as guest virtual machines run at hosts managed by the VCS) and/or other resources configured with addresses within one or blocks of addresses selected by the client for the IVN. The resources of an IVN are logically isolated from (and by default, inaccessible from) resources allocated for other clients in other IVNs. IVNs are also referred to a virtual private clouds. The client on whose behalf an IVN is established is granted substantial flexibility regarding network configuration for the resources of the IVN. For example, one or more subnets can be set up by the client within an IVN, each with a block of Internet Protocol version 4 (IPv4) addresses (and/or a block of IP version 6 (IPv6) addresses) selected by the client from within the IVN's range(s) of addresses. Within a given subnet, a given compute instance can be assigned individual IPv4 addresses, individual IPV6 addresses, ranges of IPV4 addresses, and/or ranges of IPV6 addresses chosen from the subnet's blocks of address ranges. The addresses or address ranges can be assigned to virtual network interfaces (VNIs), which are then programmatically attached or associated with compute instances or other resources. A given VNI can be programmatically detached from one compute instance and attached to another compute instance, thus transferring a set of networking properties between the instances without having to reconfigure hardware network interface cards (NICs) of the hosts at which the compute instances run. The attachment or detachment of a VNI to/from a compute instance can trigger the efficient propagation of routing information, with in some cases a single message being transmitted to inform a routing device how to forward packets whose destination addresses can be any of the thousands or millions of addresses assigned to the VNI. A given VNI, and hence the compute instance to which the VNI is programmatically attached, can have one or more ranges of IPV4 and IPV6 address assigned to it concurrently. As a result, packets of either address family can be routed from a given routing device to the same compute instance. Applications can seamlessly migrate from using IPv4 to using IPV6 without requiring routing information updates at the routing devices of the provider network.

As one skilled in the art will appreciate in light of this disclosure, certain embodiments may be capable of achieving various advantages, including some or all of the following: (a) improving the performance of applications involving high rates of network traffic directed to/from compute instances of a provider network, (b) reducing the amount of resources (e.g., including memory, storage, computing resources and network bandwidth) required at routing devices and/or (c) facilitating the migration of applications from IPv4 to IPV6, thus simplifying administration for applications that require large numbers of network addresses for a given application component. Applications in which numerous software containers requiring respective network addresses are launched within a given compute instance, as well as telecommunication applications in which a given virtualized network function implementation program communicates with thousands of end user devices represent examples of the kinds of applications which can benefit substantially from the proposed techniques.

According to some embodiments, a system may comprise a virtual network interface, a routing device, a compute instance to which the virtual network interface is programmatically attached, and one or more computing devices (such as control plane servers) which implement at least a portion of a virtualized computing service managing the compute instance. The virtualized computing service may assign, to the virtual network interface in response to one or more or programmatic requests received from a client, (a) a first range of network addresses of a first address family (e.g., IPv4) and (b) a second range of network addresses of a second address family (e.g., IPV6). A first routing information entry may be propagated to the routing device for routing packets to destination addresses within the first range, and a second routing information entry may be propagated to the routing device for routing packets to destination addresses within the second range in various embodiments. The propagated routing information entries may be stored at the routing device, e.g., as part of a set of tables or other data structures. Distinct routing information entries corresponding to each of the individual addresses of the first range and the second range may not be propagated to the routing device in at least some embodiments.

The compute instance (one example of a program execution environment) to which the virtual network interface is programmatically attached or associated may receive packets of both network families routed by the routing device in various embodiments. For example, one packet with a destination address within the first range may be routed by the routing device (a) using the first routing information entry and (b) without using a longest prefix matching (LPM) algorithm. The packet may be delivered to the compute instance after verifying that the packet satisfies a security setting, associated with the first range of network addresses, of an isolated virtual network within which the compute instance is configured in at least some embodiments. Similarly, a second packet with a destination address within the second range may be routed by the routing device (a) using the second routing information entry and also (b) without using a longest prefix matching (LPM) algorithm. The second packet may be delivered to the compute instance after verifying that the second packet satisfies a security setting, associated with the second range of network addresses, of the isolated virtual network. In at least some embodiments, respective (and in some cases different) security settings may be specified programmatically by a client for each of the address ranges (or individual addresses) assigned to a VNI or compute instance within a given isolated virtual network. Packets with other destination addresses within the first range may also be routed using the first routing information entry to the compute instance, and packets with other destinations within the second range may be routed using the second routing information entry to the compute instance. In one embodiment, after a range of addresses of a given address family is assigned to a virtual network interface at the request of a client, the client may, if desired, submit additional programmatic requests to make one or more addresses of the range accessible from the public Internet.

According to some embodiments, a client may submit a programmatic request to assign a range of network addresses (or multiple ranges) to a VNI or a compute instance without actually specifying the range(s)—instead, for example, a client may simply indicate the address family from which a range of addresses is to be assigned, and/or the total number of desired addresses. The VCS may select the address range(s) in such embodiments, e.g., based on the unused addresses (or reserved addresses) available at a subnet or an IVN in which the VNI is configured. Clients may specify the address ranges in the programmatic range assignment requests, i.e., without relying on the VCS to choose the ranges in various embodiments.

In some embodiments, clients may only be allowed to specify ranges of one or a few discrete sizes, expressed using respective CIDR (Classless Inter-Domain Routing) blocks or prefixes, for each address family. For example, in one embodiment, for IPV4, only address ranges expressed as/28 CIDR blocks may be permitted, while for IPV6, only address ranged expressed as/80 CIDR blocks may be permitted. In other embodiments, ranges of multiple sizes may be supported for one or more address families. Restricting the range sizes may help to make lookups of routing information more efficient in various embodiments, as the routing devices only have to search for routing information entries once for each range size if an exact match on a destination address fails.

When a routing device received a packet with a destination address that falls within an address range assigned to a VNI, in at least some embodiments the routing device may first try to find, within its collection of routing information for the address family indicated in the packet, a routing information entry for the full destination address. This operation may be referred to as an exact match lookup. If such an exact match entry is found, the exact match entry may be used to forward or route the packet towards its destination. If such an exact match entry is not found, in an embodiment in which only a single address range length is permitted, the routing device may perform a single prefix-based lookup in at least some embodiments. For example, in a scenario in which only/28 address ranges are permitted for IPV4, the routing device may mask the last four bits of the 32-bit IPv4 destination address to find the/28 prefix of the destination address, and then determine whether an entry for that/28 prefix is present in its collection of routing information. In various embodiments, before assigning a range of addresses to a VNI, a VCS may ensure that that range is assigned only once within the isolated virtual network (IVN) to which the VNI belongs, such that there is no overlap with another address range assignment within the IVN. As a result, in such embodiments, the maximum number of lookups that a routing device may have to perform for a given packet's destination address may be two: one exact-match lookup, and one prefix lookup. In embodiments in which address ranges of multiple sizes (e.g., /28 and/30 for IPV4) can be assigned, the upper bound on the total number of lookups may be based on the number of distinct sizes permitted.

In an embodiment in which a given compute instance is assigned (via an attached VNI) at least one IPv4 address and at least one IPv6 address and the corresponding routing information entries for both address families have been propagated to the appropriate routing devices, applications may detect that addresses of both address families are available, and initiate a transition from one address family to another if desired. For example, a notification packet formatted in accordance with one address family (such as IPv4) may be sent from an application component running at the compute instance to a peer application component running at some other execution environment (e.g., a non-virtualized server at a client premise external to the provider network). The notification packet may indicate that the compute instance is configured to receive IPV6 packets, and may provide the IPV6 address(es) assigned to the compute instance. Subsequently, the peer application component may send one or more IPV6 packets to the application component running at the compute instance. Since the IPV6 routing information has already been propagated, no additional routing information updates may be required to transmit the IPV6 packets instead of the IPv4 packets between the two application components in such embodiments.

In at least some embodiments, individual ones of the addresses of a range of addresses assigned to a VNI may in turn be utilized for respective software containers launched within a compute instance to which the VNI is attached. Thousands of containers, some lasting just a few seconds while others last for minutes or hours, may be launched at a single compute instance or execution environment over time, and respective unused addresses from an assigned range of (for example) IPV6 addresses may be chosen by a container management service for each such container.

According to at least one embodiment, compute instances optimized for implementing telecommunications or radio-based applications (such as private or public 5G (fifth generation) cellular network applications) may be launched at VCS-managed servers located at premises external to the provider network's data centers (e.g., at premises close to cells comprising telecommunication company antennas).

Such compute instances may, for example, comprise programs that implement virtualized network functions (VNFs) of the corresponding telecommunication stack, such as functions for mobility management, subscriber tracking, session management and the like. A single compute instance comprising a VNF program may have to handle packets associated with tens of thousands of end-user mobile devices in some embodiments, for each of which a respective address of an address range assigned to a VNI attached to the compute instance may be selected. Contents of packets forwarded by routing devices to which range-based routing information entries have been propagated may be processed by the VNF programs in such embodiments.

In response to detection of a failure at a first execution environment to which a range of network addresses is assigned, a message may be propagated to a routing device in various embodiments, indicating that packets with destination addresses within range are to be routed to a second execution environment to which the applications of the first execution environment have been failed over. Respective messages indicating that packets directed to individual destination addresses within the range are to be routed to the second execution environment may not have to be propagated to the routing device, thereby speeding up failover operations.

According to some embodiments, a system may comprise one or more control plane servers implementing a virtualized computing service. The control plane servers may be configured to store, e.g., in response to receiving a reservation request, metadata indicating that a sub-range of a range of network addresses of a subnet established within an isolated virtual network (IVN) is reserved for fulfilling requests of at least a particular category of a set of request categories. Each such request category may comprise requests for a particular type of operation. The set of request categories may for example include (a) bulk address assignment (e.g., assignment of multiple contiguous addresses represented using a CIDR block) and (b) client-requested individual address assignment in some embodiments. In one embodiment, a client may use programmatic interfaces of the VCS to define a custom category of requests or operations for which one or more address sub-ranges are to be reserved. In at least some embodiments, a portion of the range of network addresses of the subnet may be kept un-reserved, e.g., to be used by default for requests of categories that do not belong to the set of request categories. Subnet address sub-ranges of one or more address families (e.g., IPv4, IPV6 etc.) may be reserved in various embodiments in response to client-submitted reservation requests.

The VCS (e.g., via its control plane servers) may reject an address assignment request in some embodiments if (a) assignment of a particular address of a reserved sub-range is required and (b) the address assignment request does not belong to the particular category for which the sub-range was reserved. Such as address assignment request may, for example, be received and rejected during a time interval in which the particular address is not in use within the isolated virtual network. In some cases, such an address assignment request may be received as a result of a submission, by a client, of a service request direct to a provider network service which requires the assignment of a network address, but does not specify the address. For example, a client of a provider network may in some cases request the execution of a task by a server-less dynamically-provisioned computing service which implements a functional programming methodology. In order to execute the task or function, or communicate its results, an IP address within a subnet of an IVN of the client may be needed, and such an address may in some implementations be chosen at random from among the addresses of the subnet. In such cases, which may be referred to as "auto-assignment" of addresses, the randomly-selected address may lie within a reserved sub-range, resulting in the rejection of the corresponding address assignment request.

In response to receiving an address assignment request which does belong to the particular category for which the reservation was made, one or more addresses of the sub-range may be assigned by the VCS in various embodiments. For example, a group of contiguous IPv4 addresses represented by a /28 CIDR block may be assigned by the VCS from among the reserved addresses of a subnet. In some cases in which such bulk address assignments are performed, the client may not necessarily specify the particular address range to be assigned; instead, for example, the client may simply indicate the size and address family of the to-be-assigned group of addresses, and/or a specific reservation from which the group of addresses should be selected. In some embodiments, a set of reserved addresses need not necessarily be utilized or assigned after the set is reserved; that is, if desired, a client may simply prevent the use of a particular range or group of addresses (for example, by the VCS or other services of the provider network) at least temporarily by reserving that range or group. At the time that a client submits a reservation request, the client may not be required to specify any particular request category or operation category for which the reserved addresses are to be used in one embodiment. In some embodiments, a client may submit a reservation request without specifying a request category, and then later submit another programmatic request indicating the request category or categories for which the reserved addresses can be used. In at least one embodiment, a client may modify the request category or categories for which an address range was reserved earlier.

According to one embodiment, one or more metrics associated with subnet address reservations may be presented to a VCS client on whose behalf the addresses were reserved. For example, a count of the number of in-use addresses of a reserved set of addresses may be provided, or a list of in-use reserved addresses may be provided with respect to various time periods. (e.g., which addresses of a reserved block were in use between 3:00 PM and 3:15 PM on a specified date).

Multiple sub-ranges of the addresses of the same subnet may be reserved in some embodiments, e.g., for different categories of operations or for the same categories. Reservations may be released or freed after they are created in at least one embodiment; as a result of such a release, addresses within the previously-reserved block may be assigned to requests for any category of operations.

In at least some embodiments, as indicated above, a VCS may be implemented as part of a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or services, which may include a virtualized compute service (VCS) of the kind mentioned above, data processing service(s) (e.g., map reduce, data flow, and/or other large scale data processing techniques), data storage services (e.g., object storage services, block-based storage services, or data warehouse storage services), network function virtualization services or packet processing services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, or a cloud compute service). This service may offer compute instances of the kind discussed above (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units (CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which routing information pertaining to compute instances of a virtualized computing service to which ranges of network addresses within multiple address families are assigned may be distributed efficiently, and sub-ranges of address blocks of a given subnet configured at the virtualized computing service may be proactively reserved for client-specified usage categories, according to according to at least some embodiments. As shown, system 100 comprises resources and artifacts of several network-accessible services of a provider network 101, including a virtualized computing service (VCS) 102, a storage service 151, a container management service 155, and a server-less dynamically provisioned computing service 157. The VCS 102 may comprise control-plane components 105, a number of isolated virtual networks (IVNs) 110 such as IVN 110A and IVN 110B, and routing devices 130 in the depicted embodiment.

Control-plane components 105 of a VCS may include networking metadata distribution managers 106, automated address assignment managers 107, as well as address reservation managers 108 in some embodiments. Each of these components may be implemented using some combination of hardware and software at one or more computing devices. The control-plane of the VCS may also include several other types of components not shown in FIG. 1, such as provisioning managers responsible for acquiring virtualization servers and other resources for clients of the VCS, placement managers responsible for selecting the virtualization servers at which compute instances requested by clients are to be launched, etc. The VCS may implement a set of programmatic interfaces 177 which can be utilized by clients to submit administrative requests, such as requests to create virtual network interfaces (VNIs), assign ranges of network addresses of one or more address families to the VNIs, launch compute instances, attach VNIs to compute instances, and so on in the depicted embodiment. The programmatic interfaces 177 may, for example, include web-based consoles, command-line tools, graphical user interfaces, application programming interfaces (APIs) and the like in different embodiments. The requests may be submitted via the programmatic interfaces from client devices (e.g., desktops, laptops, mobile computing devices and the like) configured within networks at premises external to the data centers of the provider network 101. For example, VCS client C1 may submit programmatic requests via the interfaces 177 from client devices 146A within client-premise network 144A, while VCS client C2 may submit programmatic requests via the interfaces 177 from client devices 146B within client-premise network 144B.

Data-plane traffic may also flow between the client premise-networks and compute instances (CIs) set up within the VCS in the depicted embodiment, e.g., via virtual private network (VPN) connections and the like. A set of external traffic routing devices 134 (also referred to as edge routing devices) may be responsible for routing network packets between compute instances of the VCS and endpoints outside the VCS (including devices at other services of the provider network such as storage devices 152 of storage service 151, servers within the client-premise networks, etc.) in the depicted embodiment, Traffic between resources within the VCS (e.g., compute instances in different IVNs) may be routed by intra-VCS routing devices 132 in at least some embodiments.

In the scenario depicted in FIG. 1, IVN 110A is established at the VCS for client C1, and IVN 110B is set up for client C2. Within IVN 110A, subnet 115A and subnet 115B, for each of which one or more blocks of network addresses may have been selected by client C1, are created. Similarly, subnet 115K is established within IVN 110B at the request of client C2. Each subnet may comprise one or more compute instances (CIs), with one or more virtual network interfaces (VNIs) programmatically attached to a given CI. Thus, for example, VNI 122A is attached to CI 120A, VNI 122B is attached to CI 120B, VNI 122C is attached to CI 120C, VNI 122D is attached to CI 120D, VNI 122M is attached to CI 120M, and VNI 122N is attached to CI 120N. A given VNI may be assigned individual addresses within the corresponding subnet's block of network addresses of a given address family, as well as ranges of such addresses in the depicted embodiment. For example, in response to one or more programmatic requests from client C1, a range of IPV4 addresses, as well as a range of IPV6 addresses may be assigned to VNI 122A, either prior to the attachment of VNI 122A to CI 120A, or after the attachment in the depicted embodiment.

In some embodiments, a network address or range of network addresses may be assigned to a CI by (a) attaching a VNI to which those addresses have been assigned earlier or (b) changing the addresses of a pre-attached VNI. Such assignments of addresses to a CI may in turn cause networking metadata distribution managers 106 to propagate routing information to one or more routing devices 130 (such as intra-VCS routing devices 132 and/or external traffic routing devices 134), so that inbound packets directed to the CI can be routed correctly. In at least some embodiments, while assignment of an address range may in effect assign hundreds, thousands or even millions of addresses to a given CI, only a single routing information entry may be propagated for the entire range to any given routing device. To determine the CI to which a given inbound packet is to be forwarded, a routing device 132 or 134 may have to perform at most two lookups in some embodiments in which assignment of only a single size of range is permitted per address family: one for an exact match with a destination address of a particular address family indicated in the packet, and a prefix-based lookup for the range. For example, if the IPv4 addresses which can be assigned to a given VNI or CI are restricted to /28 CIDR blocks, and an IPV4 packet with a destination address within a given IVN is received, the routing device may first attempt an exact match for the complete destination address within the routing information entries maintained at the routing device. If that lookup fails, the /28 prefix corresponding to the destination address may be computed, and a lookup for that prefix may be conducted. If an entry is also not found for the /28 prefix, the routing device may drop the packet in some embodiments, and/or notify a networking metadata distribution manager that a routing information entry for the packet could not be found in some embodiments. Algorithms like longest prefix matching (LPM), which in some cases may take numerous lookups for a single packet's routing information, may not be utilized at routing devices 130 in at least some embodiments, making routing more efficient.

If the exact match lookup succeeds or the prefix lookup succeeds, the packet may be forwarded to the compute instance to which the exact match address or the range address is assigned, as long as the packet satisfies security rules defined at the IVN for inbound packets in various embodiments. According to at least some embodiments, such security rules may be specified at various granularities by clients on whose behalf the IVN is set up. For example, different security rules may be defined for respective address ranges assigned to CIs within the IVN in some embodiments, and/or for individual addresses. In a scenario in which both an IPV4 address range R1 and an IPv6 address range R2 is assigned to the same VNI attached to a given CI, a routing information entry for R1 may be stored at a routing device and used to route IPv4 packets with a destination address within R1 to CI. A different routing information entry for R2 may be used by the same routing device to route IPv6 packets with a destination address within R2 to CI. Security rules applicable to the address range R1 may be enforced/applied for the IPv4 packets prior to delivery to verify that the delivery of the IPV4 packets is permitted in various embodiments. Similarly, security rules applicable to the address range R2 (which may differ from the IPV4 security rules) may be enforced for the IPV6 packets. In some embodiments, security rules (e.g., restrictions on the source addresses of packets which can be received, or restrictions on destination addresses of packets which can be sent) set up for the resources of an IVN may be applied at virtualization management components of the servers at which the CIs of the IVN are run. In other embodiments, at least some of the security rules may be enforced at the routing devices 130.

In some embodiments, individual addresses of a range of network addresses assigned to a given CI may be utilized for respective software containers launched at the CI. The address range may, for example, be provided to a container deployment manager 156 of the provider network's container management service 155, and the container deployment manager may choose the particular address to be used for a given container. In at least one embodiment, individual addresses of a range assigned to a given CI may be utilized for communicating with respective end-users by a program implementing virtualized network functions of a telecommunications or radio-based application, such as a 5G application or an Internet-of-things (IOT) application. Programs implementing such virtualized network functions may, for example, be run at compute instances set up by the VCS at premises external to the provider network 101, e.g., at a premise close to a cell tower or close to a set of IoT sensor devices. If and when an execution environment (such as a CI set up for running virtualized network functions) to which ranges of addresses are assigned fails, all of the addresses assigned may be quickly transferred to a replacement or failover execution environment in at least some embodiments, without requiring routing updates at a per-address granularity to be propagated to routing devices.

In some embodiments, the concurrent assignment of IPV4 and IPV6 address ranges to a single compute instance may facilitate a migration from IPv4 to IPV6 for an application which requires large numbers of addresses to be assigned to at least some application components. For example, a component Comp1 of an application running at a CI with both IpV4 and IPv6 addresses assigned may communicate initially with a peer application component Comp2 at a remote device using IPv4. A message indicating that IPV6 addresses are also usable for communication with Comp1 may be sent using IPv4 to Comp2. If Comp2 also has an IPV6 address, or some other remote component of the application has an IPV6 address, further communications with Comp1 may be implemented using IPv6 in some embodiments.

In at least some embodiments, some addresses of a given subnet within an IVN may be utilized to execute tasks for which requests have been received at a server-less dynamically provisioned computing service 157. Such a service may implement a functional programming model, in which clients indicate logic or functions to be executed on their behalf (without acquiring resources such as compute instances in advance), and the service chooses computing resources for executing the logic, causes the logic to be executed and provides the results of the logic to a destination indicated by the client. In at least one embodiment, the functions requested by a given client may be executed using resources within a corresponding IVN subnet, and addresses of that subnet may be chosen by task execution managers 158 of the server-less dynamically provisioned computing service in order to enable communication between programs implementing the functions and the destinations to which results are to be sent. The specific IP addresses used by the server-less computing service may, by default, be chosen at random from the currently-unused addresses of a subnet in some embodiments. Addresses may also be chosen from within a subnet's address block in some embodiments in which a client does not specify a particular address which is to be used for a given CI launched on the client's behalf. For example, an automated address assignment manager 107 of the VCS control plane may choose a randomly-selected unused address from a subnet for a CI for which a client does not indicate a desired address. The address block of a given subnet may become fragmented, with randomly selected addresses being used from its address block.

If a client wishes to use large blocks of contiguous addresses for one or more purposes, the client may utilize an address reservation mechanism implemented at the VCS in some embodiments. Such a client may utilize programmatic interfaces 177 to submit address reservation requests. A given reservation request may indicate a sub-range of a range of addresses of a subnet which is to be reserved for fulfilling requests or performing operations of at least one category indicated in the request in various embodiments. Such categories of requests or operations may, for example, include bulk address assignments (e.g., when the client requests a range of addresses to be assigned to a VNI), client-requested individual address assignments, and the like. In at least some embodiments, a client may use programmatic interfaces 177 to define custom categories of operations, and then designate that reserved address sub-ranges be restricted to operations of such a custom category. For example, a client may indicate that a custom category Cat1 of requests includes requests received from a specified range of users associated with the client account.

In response to receiving a reservation request and performing one or more verification tests, an address reservation manager 108 of the VCS may store metadata indicating the details of the reservation, e.g., in a repository maintained at the control plane of the VCS. In some embodiments, the verification tests may ensure that addresses of the sub-range are not currently in use (e.g., that none of the addresses is assigned to a currently-active CI) and are not currently reserved.

After the metadata of a reservation for a portion of a subnet's addresses is stored, the VCS may take the reservations into account when responding to subsequent requests that require addresses of the subnet to be assigned. For example, the VCS may reject an address assignment request in response to determining that (a) assignment of a particular address of a reserved sub-range of an IVN's subnet is requested and (b) the address assignment request does not belong to the particular category of operations or requests for which the sub-range was reserved. Such an address assignment request may be received and rejected by the VCS during a time interval in which the address is not in use within the IVN. In contrast, in response to an address assignment request which belongs to the category for which the sub-range was reserved, one or more addresses of the reserved sub-range may be assigned in various embodiments.

The amount of detail provided by a client when requesting assignment of a range of addresses to a VNI or a CI may vary in some embodiments. In some address range assignment requests, for example, a client may simply indicate the size of the range and the address family (e.g., that 16 addresses corresponding to a /28 block of IPV4 addresses are to be reserved, that 64 addresses corresponding to a /26 block of IPV4 addresses are to be reserved, or 2^48 addresses corresponding to /80 block of IPV6 addresses be reserved), and the VCS may choose an unused range of the appropriate size for fulfilling the request. In other address range assignment requests, a client may specify the range. Similarly, in some address reservation requests, a client may simply specify the subnet, the sub-range size and the address family, and the VCS may choose the sub-range of the subnet's range of addresses to be reserved. Multiple address ranges of one or more address families may be assigned to a given VNI or CI in at least some embodiments. Similarly, in at least one embodiment, multiple sub-range address reservations may be made for a given subnet. Reservations of address sub-ranges may be freed in response to client requests in various embodiments, enabling addresses of the previously-reserved sub-ranges to be utilized for requests whose categories were not listed among the permitted request categories during the time that the sub-range was reserved.

Figure 2:
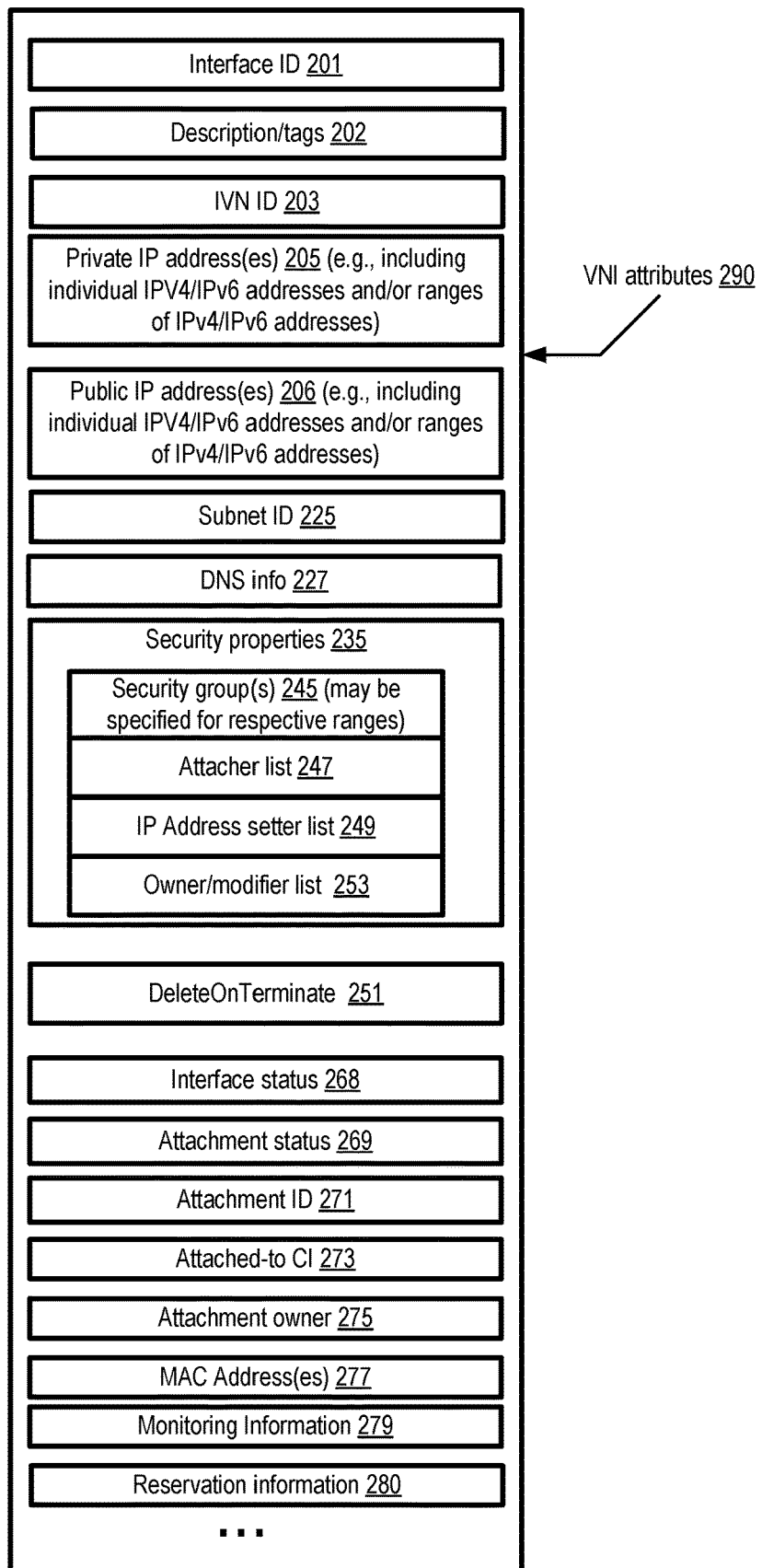
FIG. 2 illustrates example attributes of a virtual network interface configured at a virtualized computing service, according to at least some embodiments.

In at least some embodiments a virtual network interface (VNI) may represent a collection of networking-related attributes that can be dynamically associated with or disassociated from compute instances or virtual machines via "attach" and "detach" operations respectively. FIG. 2 illustrates example attributes of a virtual network interface which may be configured at a virtualized computing service, according to at least some embodiments. Only a subset of the attributes or properties shown in FIG. 2 may be used in some embodiments, and not all the implemented attribute fields may have to be populated (i.e., some of the attributes may be left blank or null). Respective records comprising fields/entries containing the attributes 290 of various VNIs may be stored in a persistent metadata store in some embodiments, e.g., a store that is accessible from various control-plane or administrative components of the provider network or the VCS.

When a new VNI is created, e.g., in response to a programmatic request from a client of a VCS, a new interface identifier 201 may be generated for it in the depicted embodiment. In some implementations, a description/tags field 202 may be filled in by the client that requested the creation of the VNI, e.g., "Interface 554 for client group CG-X of file storage service". As discussed earlier, a VCS within which the VNI is to be used may comprise a plurality of IVNs in some embodiments. The attributes 290 may contain an IVN identifier 203 (indicating an IVN within which the VNI is configured) in such embodiments.

Any of several types of network addressing-related fields may be included within the set of attributes of a VNI in different embodiments. One or more private IP addresses 205, or ranges of such addresses, may be specified in some embodiments, for example. Such private IP addresses, also referred to herein as non-public addresses, may be used internally for routing within the provider network, and may not be directly accessible from outside the provider network (or within other IVNs) by default in various embodiments. In some embodiments, at least some non-public IP addresses associated with a VNI may not be IP addresses; that is, addressed formatted according to a proprietary protocol of the provider network may be used, or addresses formatted according to a different public-domain protocol may be used. In general, zero or more public IP addresses 206 may also be associated with VNIs in some embodiments; these IP addresses may be visible outside the provider network, e.g., to various routing devices of the public Internet or peer networks of the provider network. Individual addresses and/or addresses ranges of the IPV4 address family, the IPV6 address family, or both address families may be assigned to a given VNI in various embodiments.

One or more subnet identifiers 225 may be included within attributes 290 in some embodiments, such as identifiers of subnets set up by a client within an IVN in which the VNI is to be used. In one embodiment an identification of a Domain Name Server (DNS) responsible for propagating address(es) associated with the VNI, or other DNS-related information 227, may be included in the attributes 290 as well.

In some embodiments the attributes 290 may include security-related properties 235. Some provider networks may allow users to specify rules, including for example firewall-related rules, for the types of incoming and/or outgoing traffic allowed at compute instances to which a VNI may be attached. Such rules may be termed "security groups" and identified via security group(s) fields 245. Security groups may be applied at any of several different granularities in some embodiments: e.g., to a VNI as a whole, to a given range of addresses of the VNI, or to individual addresses of a VNI. Various port and protocol restrictions may be enforced using security groups in some embodiments, and multiple rules may be associated with each VNI. For example, a client may use security groups to ensure that only HTTP and HTTPs outgoing or incoming traffic is allowed, to limit the set of TCP or UDP ports to which traffic is permitted, to filter incoming and outgoing traffic according to various policies, and so on.

In some implementations an attacher list 247 may be specified, indicating which users or entities are allowed to request attachments of the VNI to compute instances or other execution environments. In some cases a separate detacher list may be used to specify which entities can detach the VNI, while in other cases a single list such as attacher list 247 may be used to identify authorized attachers and detachers. The collection of users or entities that are allowed to set or modify IP addresses or address ranges (e.g., public IP addresses 206 and/or private IP addresses 205) of the VNI may be provided in IP address setter list 249, and the set of users or entities that own (or can modify various other fields of) the VNI may be specified in owner/modifier field 253 in some embodiments. For example, an owner/modifier identified in field 253 may be permitted to change the attacher list 247 or the IP address setter list in some implementations, thus changing the set of entities permitted to attach or detach the VNI or modify its IP address(es). While the term "list" has been used for fields 247, 249, and 253, logical data structures other than lists (such as arrays, hash tables, sets and the like) may be used to represent the groups of entities given various security privileges, roles and/or capabilities in various embodiments.

In some embodiments, users of the VCS of a provider network may be allowed to terminate execution environments, such as CIs to which VNIs can be attached, programmatically. For example, a client may set up CIs, attach VNIs to the CIs, run a desired set of computations on the CIs, and then issue a request to terminate the instances when the desired computations are complete. In such embodiments, a DeleteOnTerminate setting 251 may be used to specify what happens to attached VNIs when a CI is terminated. If DeleteOnTerminate is set to "true" for a VNI attached to the CI being terminated, the VNI may be deleted (e.g., a persistent record comprising attributes 290 for the VNI may be removed from the repository in which it was being stored). If DeleteOnTerminate is set to "false", the VNI may be retained, so that for example it may be attached again to some other CI or other computing platforms. In one embodiment, when a VNI is attached to a CI, an attachment record separate from the VNI attributes 290 may be created to represent that relationship, and the DeleteOnTerminate property may be associated with the attachment record instead of or in addition to being associated with the VNI itself. In such an embodiment, the VNI's attributes 290 may include a reference or pointer to the attachment record or records for each of the attachments in which the VNI is currently involved, and different values of "DeleteOnTerminate" may be set for each attachment record.

The interface status field 268 may be used to indicate a current state of the VNI e.g., whether the VNI is "available", "disabled", or "in-repair". Similarly, the attachment status field 269 may be used to indicate whether the VNI is currently attached, detached or in the process of being attached or detached in some embodiments. In one implementation, as described above, a record of an attachment may be created at the time the corresponding attachment operation is performed, and an identifier or identifiers of the current attachments of the VNI may be stored in attachment id field 271. Identifiers of the CIs to which the VNI is currently attached may be stored in attached-to instance field 273, and the user or entity that requested the attachment may be identified via attachment owner field 275 in some embodiments. In one embodiment, a list of identifiers of the physical network interface card (NIC) or NICs currently usable for traffic directed to/from the IP addresses of the VNI may be maintained, e.g., in the form of a MAC address(es) field 277. In some implementations, monitoring information 279, such as statistics about the amount of traffic flowing to or from the IP addresses of the VNI, may also be retained among attributes 290. In one embodiment, a reservation information field 280 may indicate whether an address assigned to a VNI is part of a reserved sub-range of a subnet. Other fields not shown in FIG. 2 may be included in various embodiments.

In one embodiment, some of the fields shown in FIG. 2 may be replaced by references or pointers to other objects. For example, security information for a VNI may be stored in a separate security object, and the attributes 290 may include a reference to the security object. Similarly, each attachment of a CI to a VNI may be represented by an attachment object, and the attributes 290 may include pointers to the appropriate attachment objects in some implementations.

Figure 3:
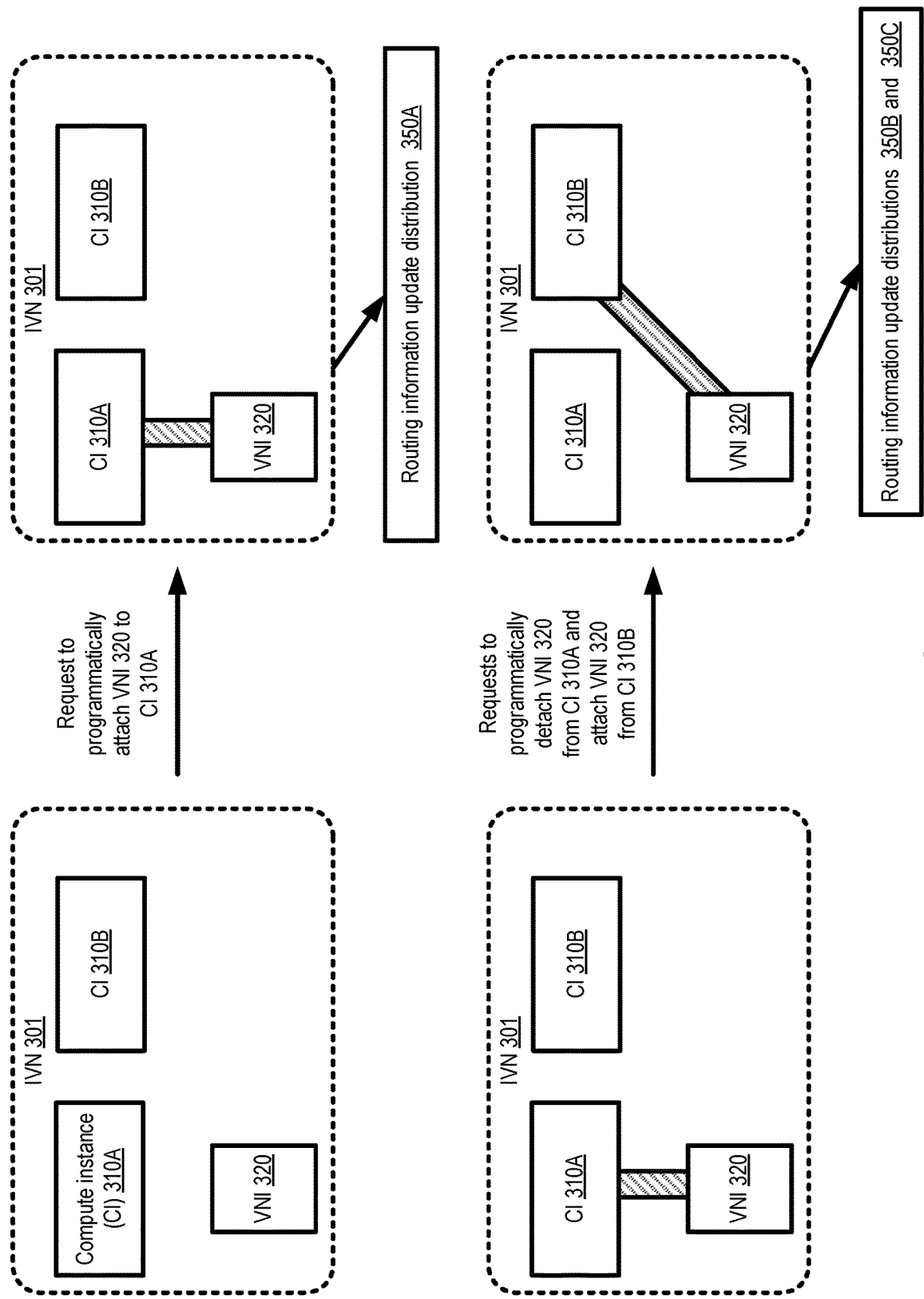
FIG. 3 illustrates example operations which may trigger routing information updates at a virtualized computing service, according to at least some embodiments.

FIG. 3 illustrates example operations which may trigger routing information updates at a virtualized computing service, according to at least some embodiments. In the example scenario shown in FIG. 3, compute instances (CIs) 310A and 310B may be launched within an IVN 301 of a VCS similar to VCS 102 of FIG. 1. A VNI 310 may also be created within IVN 301, e.g., in response to a programmatic request from a client, and a range of IP addresses may be assigned to the VNI. In response to a request to programmatically attach the VNI 320 to CI 310A, metadata indicating an associated between CI 310A and VNI 320 may be stored at the VCS. This may result in routing information update distribution 350A, in which a routing information entry may be propagated to at least one routing device, indicating that packets with destination addresses within the range are to be directed to the virtualization host comprising CI 310A.

Later, one or more requests to programmatically detach VNI 320 from CI 310A, and attach VNI 320 to CI 310B may be received from the client at the VCS. In response, the metadata stored at the VCS may be modified to indicate the dissociation of VNI 320 from CI 310A, and the association of VNI 320 with CI 310B in the depicted embodiment. These changes in turn may trigger routing information update distributions 350B (for the dissociation) and 350C (for the association) in at least some embodiments. Even though the range of IP addresses may contain millions of distinct addresses (e.g., $2^{48}$ addresses in the case of a /80 IPv6 prefix), only a single message per association/dissociation event may be propagated in at least some embodiments.

Figure 4:
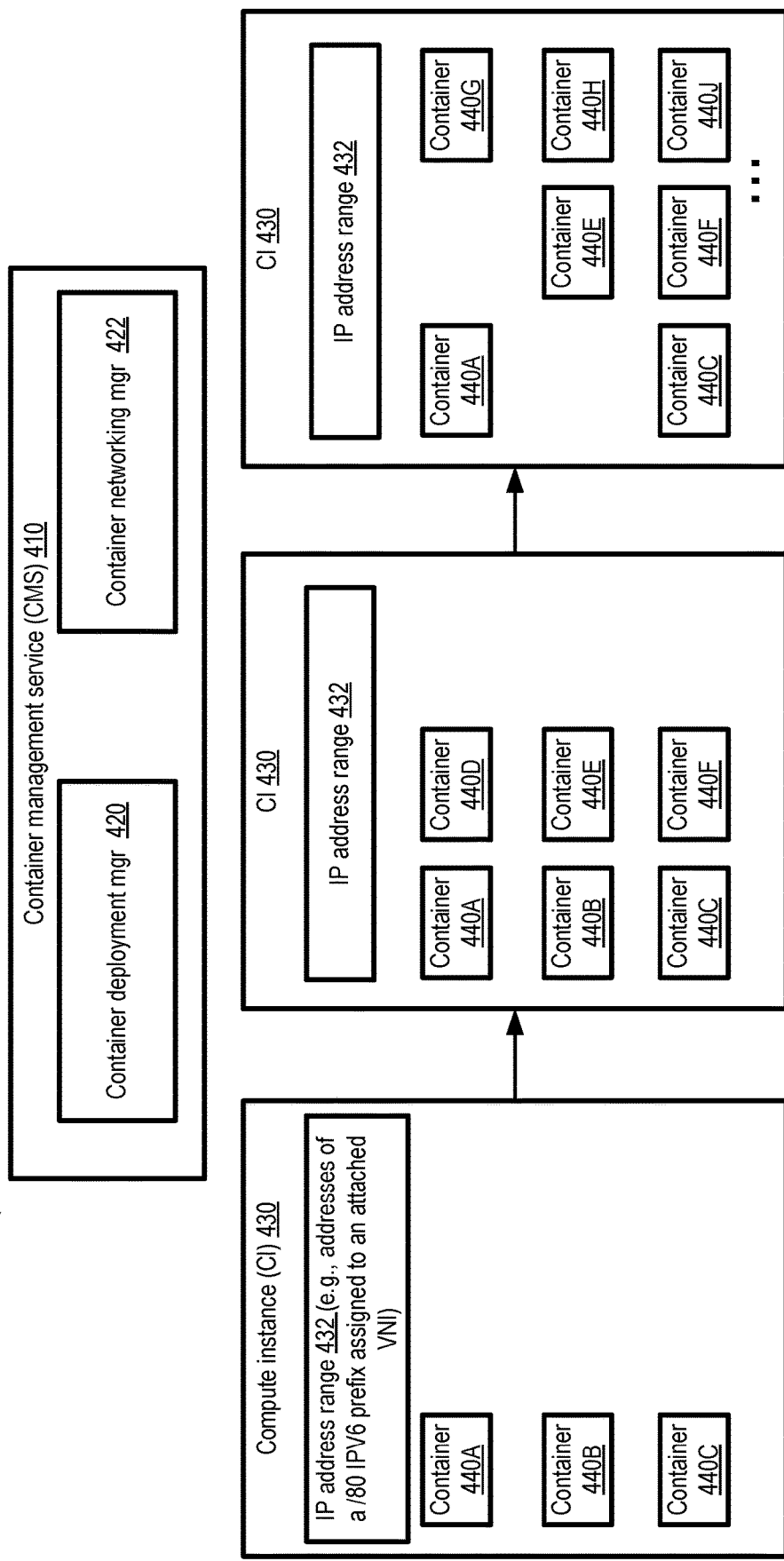
FIG. 4 illustrates an example scenario in which individual addresses of a large range of addresses of a compute instance may be assigned to respective software containers launched within the compute instance, according to at least some embodiments.

FIG. 4 illustrates an example scenario in which individual addresses of a large range of addresses of a compute instance may be assigned to respective software containers launched within the compute instance, according to at least some embodiments. A compute instance 430 has an IP address range 432 assigned to it in the example scenario, e.g., comprising all the addresses of a /80 IPv6 prefix assigned to a VNI attached to the compute instance. The range 432 may be obtained programmatically at a container management service (CMS) 410 from which the execution of numerous software containers 440 at CI 430 for an application is to be orchestrated in the depicted embodiment. To individual ones of the containers 440 deployed at the CI 430 by container deployment manager 420 of CMS 410, a currently-unused address from the range 432 may be assigned by a container networking manager 422 of CMS 410 in the depicted embodiment.

The total number and individual lifetimes of the containers 440 launched at CI 430 may vary substantially in some embodiments. In some cases, thousands of containers may be launched within the CI, e.g., to handle respective requests from end users of the application running at the CI. Some containers may only be needed for a few seconds, while other may run for hours. For example, containers 440A, 440B and 440C may be launched at some point in time, and containers 440D, 440E and 440F may be launched later. At some point thereafter, containers 440B and 440D may have terminated, and containers 440G, 440H and 440J may have been launched. The container networking manager 422 may keep track of which of the addresses are in use by currently-running containers, and re-use addresses of containers that have terminated execution if needed. Network packets directed to the containers 440 may be routed by routing devices in the depicted embodiment using the per-address-range routing information entries described above. The propagation of a single routing information entry for the entire range 432 may substantially simplify the management of networking for applications which require large numbers of containers to be executed in various embodiments.

Figure 5:
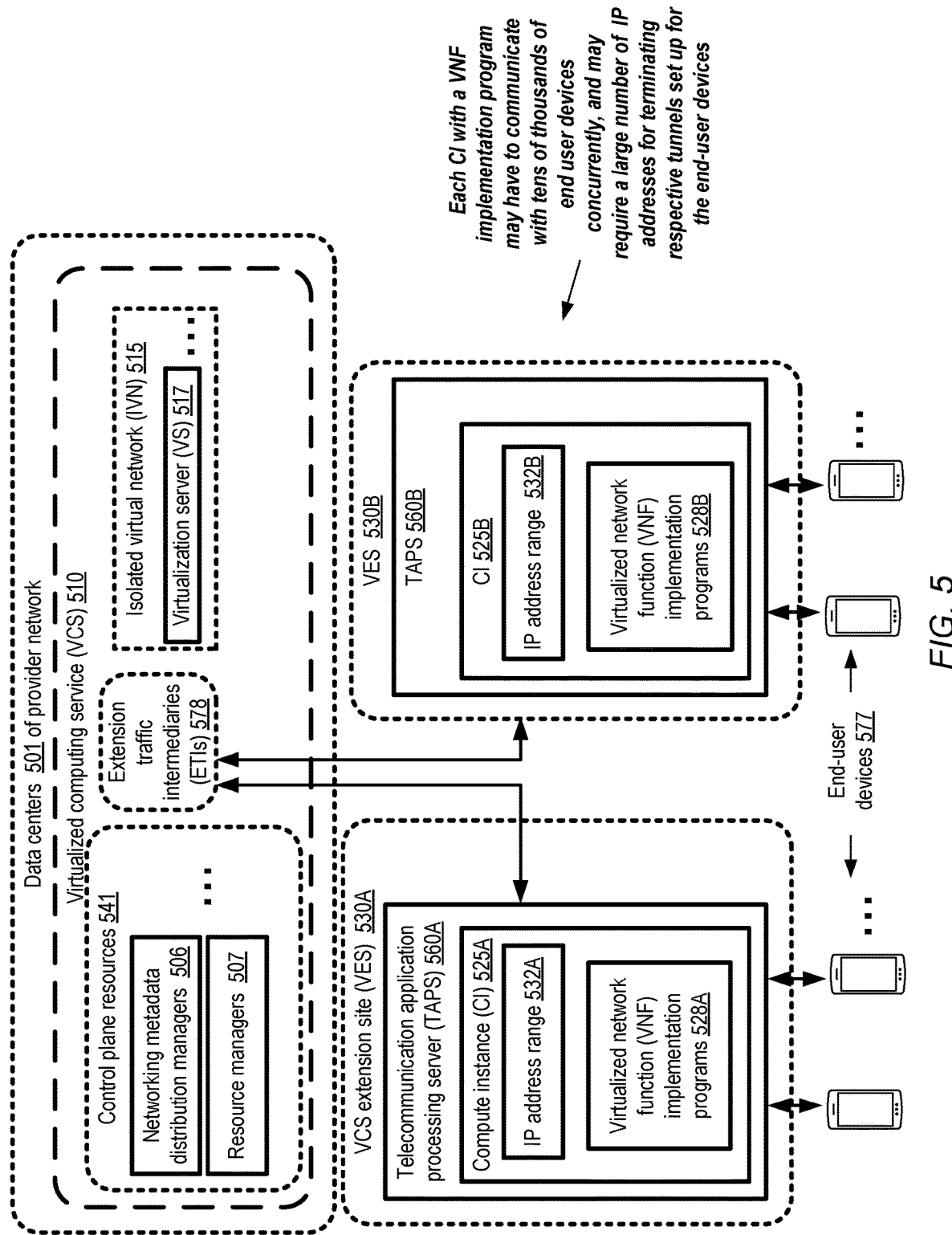
FIG. 5 illustrates an example scenario in which individual addresses of a large range of addresses of a compute instance may be used to communicate with respective end user devices of a telecommunication application, according to at least some embodiments.

FIG. 5 illustrates an example scenario in which individual addresses of a large range of addresses of a compute instance may be used to communicate with respective end user devices of a telecommunication application, according to at least some embodiments. One or more VCS extension sites (VESs) 530, such as VES 530A and 530B, may be established in the depicted embodiment at premises external to the data centers 501 of a provider network at which the control plane resources 541 of a VCS 510 are implemented. Each of the VCS extension sites may comprise one or more compute instances (CIs) 525 such as CI 525A and CI 525B, instantiated at a telecommunication application processing server (TAPS) 560 managed by resource managers 507 of the control plane of VCS 510.

Each compute instance 525 may in turn comprise one or more virtualized network function (VNF) implementation programs 528, such as VNF implementation programs 528A at CI 525A and VNF implementation programs 528B at CI 525B. A given VNF may, for example, include logic for subscriber session management, mobility management and the like of a telecommunication application serving large numbers of end-user devices 577 such as cell phones, IoT devices and the like. A given VNF implementation program may have to communicate with tens of thousands of end user devices at a time, e.g., via respective network tunnels set up for the individual end user devices. In the embodiment depicted in FIG. 5, an IP address range 532 (e.g., IP address range 532A or 532B) may be assigned to each CI at a VES, e.g., by attaching a VNI to the CI. Network metadata distribution managers 506 may propagate a respective routing information entry corresponding to each such range to one or more routing devices in the depicted embodiment, which may in turn enable packets directed to the addresses to be sent to the CIs. The VNF implementation programs and/or other components of the telecommunication application may keep track of which addresses of the range are currently in use for communications with end-user devices, and select unused addresses of the range as needed when communication with additional end user devices is required. A given CI 525 at a VES 530 of a VCS client may be configured within an IVN 515 set up on behalf of that client, and may communicate using the routing information propagated by networking metadata distribution managers 506 with other CIs set up at virtualization servers (VSs) 517 within the provider network data centers 501 if desired. The CIs at a VES may in effect be configured as a logical extension of IVN 515. As such, various networking configuration settings of the IVN, such as the available ranges of IP addresses, subnet settings including reserved subranges, egress/ingress security rules and the like, may also be applied to the VES CIs in the depicted embodiment. CIs run at virtualization servers 517 within the data centers may, for example, be used to execute other parts of the telecommunication applications implemented with the help of the servers installed at the VESs.

In at least some embodiments, the telecommunication application processing servers (TAPS) used for executing CIs with VNF implementation programs may be configured by the provider network operator with the appropriate hardware (which may in some cases include custom hardware devices optimized for telecommunication applications), software and firmware and then shipped to the VESs. In some embodiments, at least some of the TAPS may be run at data centers of the provider network.

In response to programmatic requests from clients of the provider network, via network paths which do not include the TAPSs themselves, instance launch managers of the VCS (e.g., components of the resource managers 507) may launch one or more CIs at the TAPSs on behalf of the clients in the depicted embodiment. Connectivity between the TAPSs and resources and services of the provider network data centers 501, including control plane resources 541 and data plane resources such as resources within IVN 515, may be managed by a set of extension traffic intermediaries (ETIs) 578 in the depicted embodiment. ETIs 578, implemented using one or more computing devices, which may be kept logically (and/or physically) separated from the servers and devices of the VCS control plane, may be used to transmit administrative commands from the VCS control plane to the TAPSs using secure networking channels in various embodiments. ETIs 578 may be configured, e.g., by setting properties of virtual network interfaces appropriately, so as to ensure that administrative messages cannot be directed back to the VCS control plane from the VESs via the secure networking channels in various embodiments, thus preventing administrative operations that could affect other customers from being initiated at a VES.

At a high level, in various embodiments, VCS extension sites may be supported to provide secure data plane functionality of the VCS (e.g., the ability to instantiate compute instances identical to, or at least very similar to, those that can be set up within provider network data centers) at any location selected by a VCS customer that is capable of hosting at least a small amount of hardware equipment and has Internet connectivity. A number of techniques may be used to ensure that the quality of virtualized computing and other functionality that is provided at VESs (including aspects such as security, performance, availability, and the like) meets the standards of the VCS and the provider network in different embodiments. The provider network operator may, for example, ensure that TAPSs comprise a number of hardware, software and/or firmware elements that are especially designed to enable remotely generated virtualization-related administrative commands to be executed in a safe and secure manner, without for example requiring messages to be sent back to the sources (such as control plane resources 541) from which the command were originally issued. In some embodiments, such elements may include offloaded virtualization management components (OVMCs) that include trusted platform modules (TPMs) or other security modules, tamper-resistant storage devices whose contents can only be decrypted as long as the storage devices are physically attached to a particular TAPSs, a low-overhead virtualization management software stack, and so on. In at least some embodiments, a TAPS may comprise a VCS control plane agent that does not make outbound calls and implements an API for inbound commands that is protected using TLS (Transport Layer Security) sessions. Such an API may have strong authorization, authentication and accounting-related controls in various embodiments. In at least some embodiments, no shared secrets associated with virtualization management may be stored within a TAPS itself.

Figure 6:
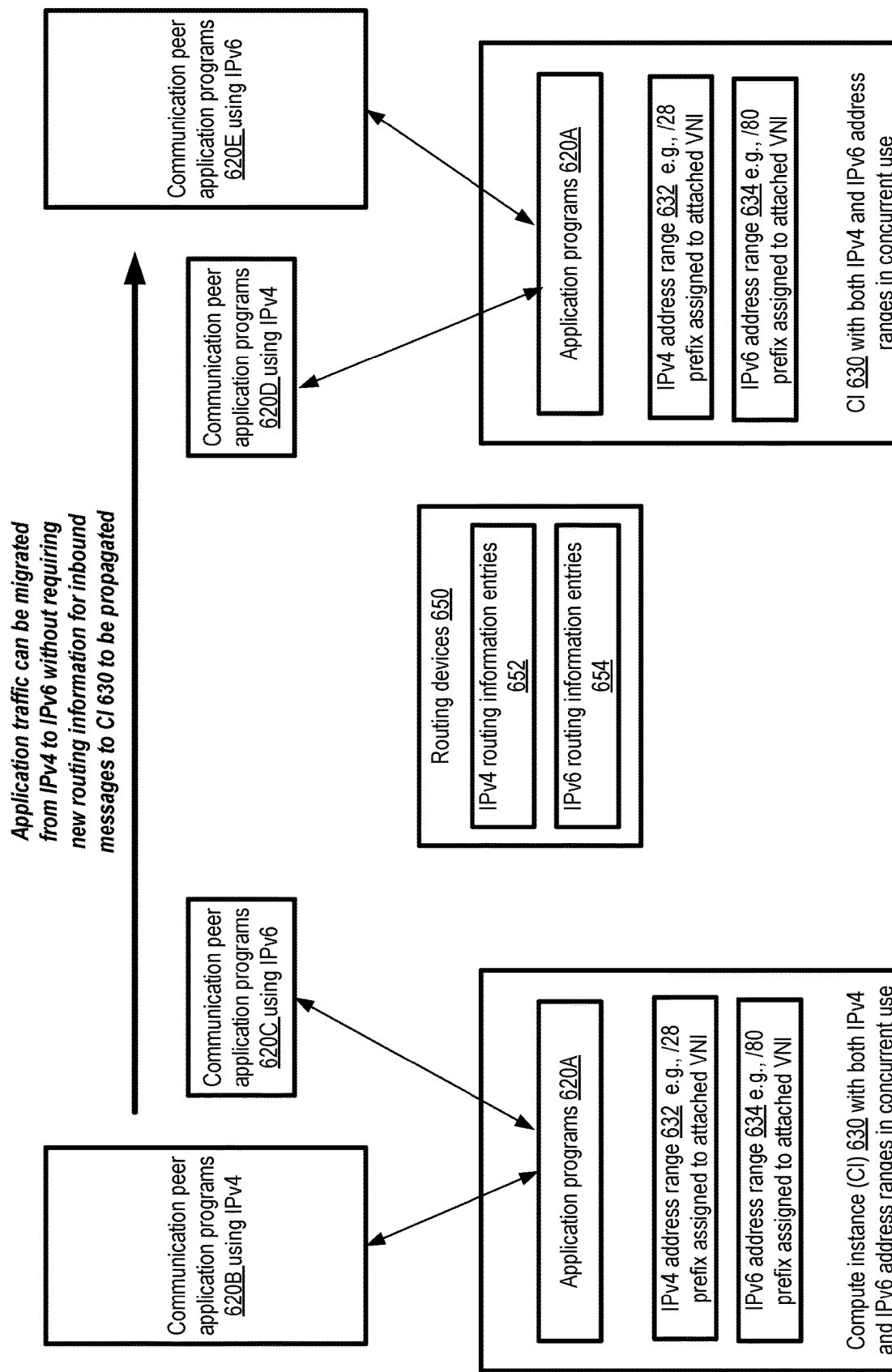
FIG. 6 illustrates an example scenario in which applications with components running on compute instances may be migrated seamlessly from one version of the Internet Protocol to another, according to at least some embodiments.

FIG. 6 illustrates an example scenario in which applications with components running on compute instances may be migrated seamlessly from one version of the Internet Protocol to another, according to at least some embodiments. In the embodiment depicted in FIG. 6, a set of application programs 620A of a distributed application may be executed at a compute instance (CI) 630 to which an IPV4 address range 632 and an IPV6 address range 634 have been assigned. The IPV4 address range may, for example comprise addresses of a /28 IPv4 CIDR prefix, while the IPv6 address range may comprise addresses of a /80 IPv6 CIDR prefix. Addresses within both ranges may be in use concurrently in the depicted embodiment, e.g., for sending packets back and forth from CI 630 to communication peer application programs of the distributed application at other execution environments within the VCS at which CI 630 is run (or at execution environments external to the VCS).

At a point in time corresponding to the left portion of FIG. 6, IPv4 routing information entries 652 propagated to a routing devices 650 may include a respective entry for the ranges 632 and 634. IPv4 packets originating at communication peer application programs 620B running at execution environments other than CI 630 may be routed to CI 630 using an IPV4 routing information entry stored at a routing device, while IPv6 packets originating at communication peer application programs 620C running at other execution environments may be routed to CI 630 using an IPV6 routing information entry 654 stored at a routing device. The number of communication peer application programs using IPv4 may be larger than the number of communication peer application programs using IPV6, e.g., because many of the programs utilize IPv4 by default for historical or other reasons.

In order to take advantage of the far larger numbers of addresses available when IPV6 is used, designers/owners of the application programs may wish to migrate their applications from IPv4 to IPV6 in the depicted embodiment. In some cases, an application program 620A may notify (e.g., using one or more IPv4 messages) its communication peers that IPv6 addresses can also be used to communicate with the program 620A if desired. Gradually, more and more peer application programs may migrate to using IPv6 addresses to communicate with CI 630 in the depicted embodiment, as shown in the right portion of FIG. 6. The majority of communication peer application programs 620E may eventually (if desired) use IPV6, while the relative number of communication peer application programs 620D using IPv4 may shrink over time. Because the routing devices 650 already have routing information entries for the ranges of both address families for CI 630, the transition from IPv4 to IPV6 may not require any new routing information for inbound messages/packets to CI 630 to be propagated in at least some embodiments.

Figure 7:
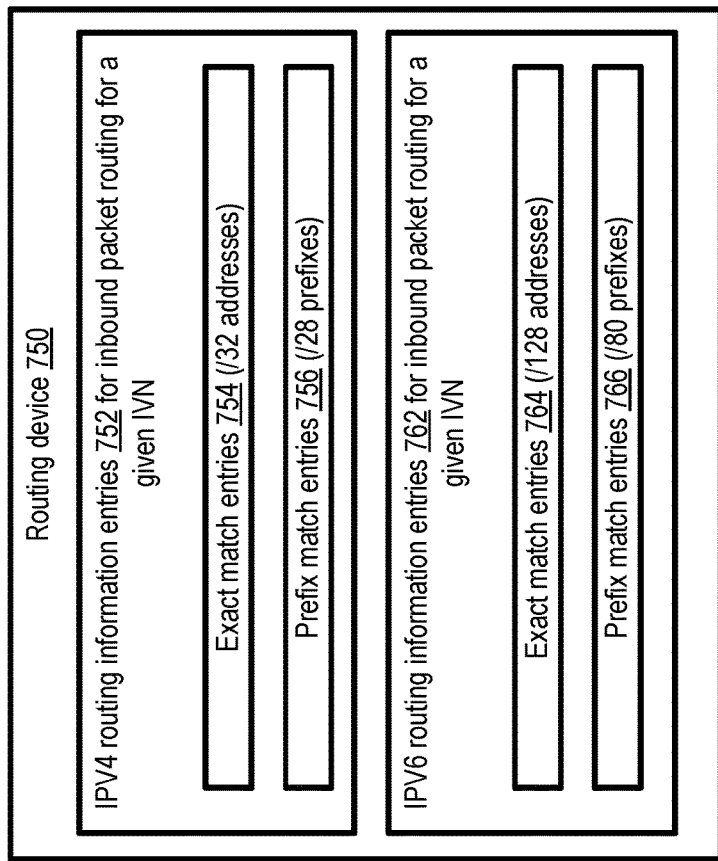
FIG. 7 illustrates an example arrangement of routing information entries at a routing device of a provider network, according to at least some embodiments.
Figure 7:
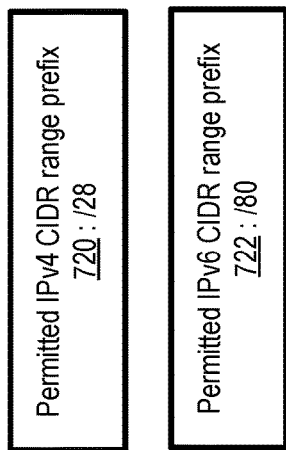

FIG. 7 illustrates an example arrangement of routing information entries at a routing device of a provider network, according to at least some embodiments. IN the embodiment depicted in FIG. 7, ranges of only a single size within a given address family may be assigned to a VNI (and hence to a CI), although multiple ranges of that size may be assigned to the same VNI or the same CI. The permitted IPv4 CIDR range prefix 720 is /28, representing 16 contiguous addresses, while the permitted IPV6 CIDR range prefix 722 is /80, representing 2^48 distinct addresses. In other embodiments, ranges of additional sizes may be permitted for one or more address ranges.

At a routing device 750 (similar to intra-VCS routing devices 132 of FIG. 1 or an external traffic routing device 134 of FIG. 1, also referred to as an edge routing device), the IPV4 routing information entries 752 for inbound packet routing for a given IVN of the VCS may comprise two types of entries in the depicted embodiment. Exact match entries 754 may each comprise routing information for a respective /32 destination address within the IVN, while prefix match entries 756 may each comprise routing information for a /28 prefix. Similarly, the IPv6 routing information entries 762 for inbound packet routing for the IVN may comprise two types of entries in the depicted embodiment. Exact match entries 764 may each comprise routing information for a respective /128 destination address within the IVN, while prefix match entries 766 may each comprise routing information for a /80 prefix. The routing information entries may be distributed among one or more data structures in different embodiments, such as route tables, mapping tables and the like. When assigning IP address ranges to a VNI or a CI within a given IVN, the VCS may ensure that ranges do not overlap with one another in at least some embodiments. As a result, when an inbound packet (a packet directed to the IVN from outside the IVN) with a destination address D within an address family AF is received, the routing device may require at most two lookups within its routing information entries for that address family: one for an exact match for D, and (only if the exact match lookup fails), a prefix lookup for the /28 or/80 prefix corresponding to D. This is in contrast to the more general longest prefix match (LPM) algorithms used in some conventional routing schemes, in which the number of lookups required may potentially be much greater than two.

Figure 8:
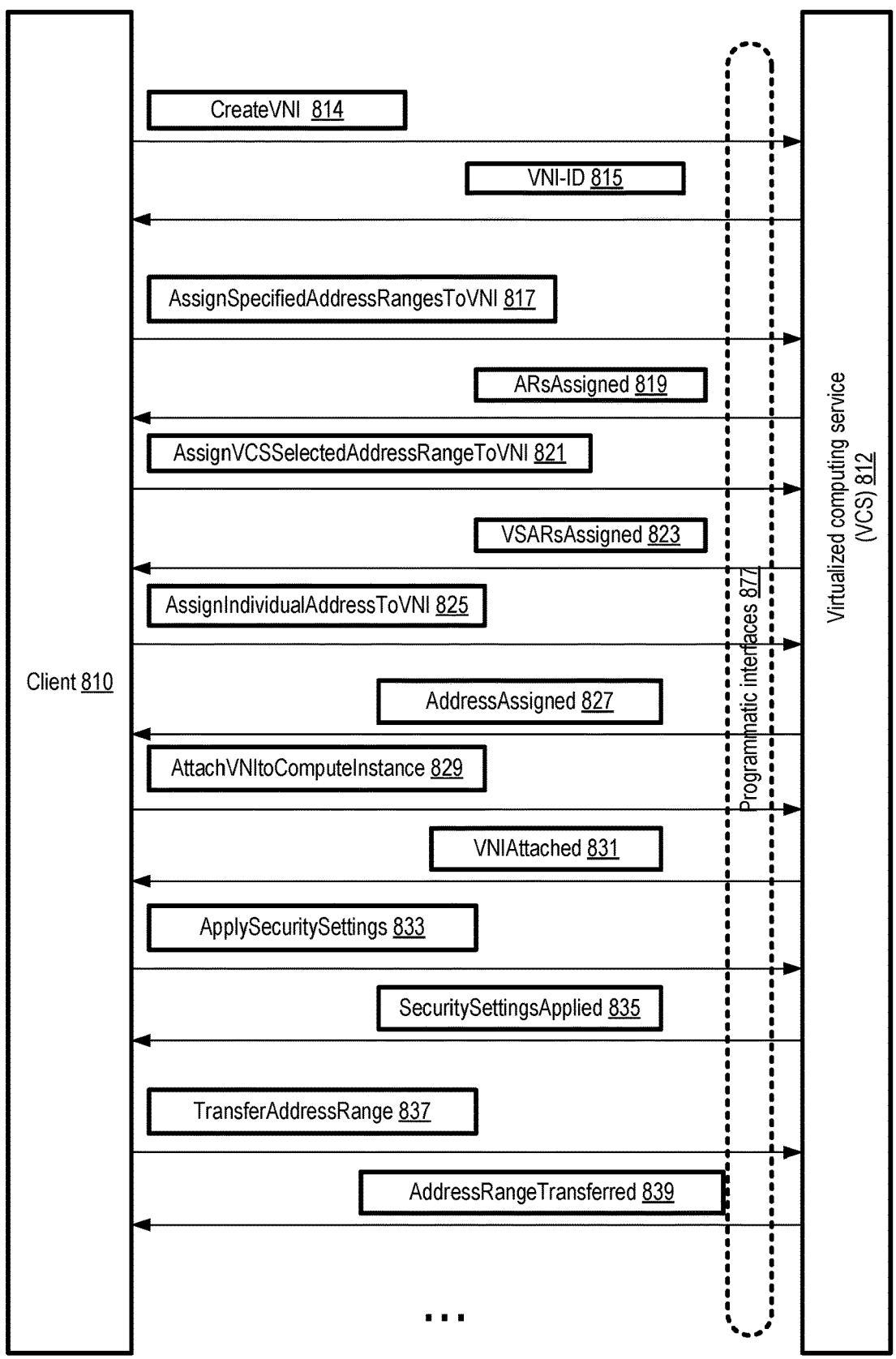
FIG. 8 illustrates example programmatic interactions between clients and a virtualized computing service, pertaining to the assignment of ranges of network addresses to virtual network interfaces and compute instances, according to at least some embodiments.

FIG. 8 illustrates example programmatic interactions between clients and a virtualized computing service, pertaining to the assignment of ranges of network addresses to virtual network interfaces and compute instances, according to at least some embodiments. A VCS 812, similar in features and functionality to VCS 102 of FIG. 1, may implement a set of programmatic interfaces 877 to enable clients 810 to submit programmatic requests pertaining to address range assignment in the depicted embodiment. The programmatic interfaces 877 may include, for example, web-based consoles, command-line tools, APIs, graphical user interfaces and the like.

A client 810 may submit a CreateVNI request 814 to create a virtual network interface in the depicted embodiment. In response, metadata comprising information corresponding to at least some fields shown in FIG. 2 may be stored at the VCS, and an identifier VNI-ID 815 of the created VNI may be sent to the client. The client may, for example, use parameters of the CreateVNI to indicate the subnet and IVN within which the VNI is to be utilized at least initially.

As AssignSpecifiedAddressRangesToVNI request 817 may be used by a client to specify a particular address range (expressed for example as a CIDR block), or multiple address ranges, to be assigned to a VNI. In response to such a request, the metadata stored for the VNI may be updated to include the address range(s), and an ARsAssigned message 819 may be sent to the client.

In some scenarios a client may not necessarily wish to choose the exact address range for a VNI (as this may require ensuring that the chosen address range does not overlap with other already-in-use address ranges), and may instead submit an AssignVCSSelectedAddressRangeToVNI request 821, allowing the VCS to choose an address range within a specified address family from among the available addresses of the IVN or subnet in which the VNI is configured. In at least one embodiment, the client 810 may indicate the size of the address range desired (which may for example be expressed using a CIDR block size indicator such as /28 or /80), thus informing the VCS about the number of contiguous addresses desired, without specifying the actual address range. In one embodiment, the client may not have to specify the size or number of addresses, as the VCS may use a default range size permitted for the specified address family. In response to the AssignVCSSelectedAddressRangeToVNI, the VCS may choose a range of the appropriate size (after verifying that none of the addresses of the range are currently assigned within the IVN), assign it to the specified VNI, and send a VSARsAssigned response message 823 to the client.

In addition to or instead of assigning ranges of addresses to VNIs, a client 810 may assign individual addresses of one or more address families to a given VNI in some embodiments, e.g., by submitting an AssignIndividualAddressToVNI request 825. The indicated address (if it is not in use) may be assigned by the VCS to the VNI, and an AddressAssigned message 827 may be sent to the client. Note that in some embodiments, instead of using separate requests to create a VNI and then assign ranges of addresses or individual address to it, parameters indicating the desired address range, range sizes or individual addresses may be included in the request to create the VNI.

A client 810 may send an AttachVNIToComputeInstance request 829 to attach a VNI to a CI in some embodiments. The VNI may be programmatically attached to the specified CI, and a VNIAttached message 831 may be sent to the client. In some embodiments, a VNI may be automatically created and attached to a CI in response to a response to launch the CI, and the launch request for the CI may indicate the address(es) to be assigned to the VNI and hence to the CI.

In at least one embodiment, a client may specify security settings, at one or more granularities, to be applied to a VNI, e.g., by submitting an ApplySecuritySettings request 833. The security settings (e.g., security groups or rules indicating permitted destinations and sources for inbound and outbound traffic) may, for example, be specified at the address range level, at an individual address level, or collectively for all the addresses of the VNI. In some embodiments, a common set of security settings may be specified for all the VNIs within a given subnet or a given IVN. Different security settings may be specified for individual address ranges or addresses of a given VNI in at least some embodiments. Metadata indicating the security settings may be stored at the VCS, e.g., as part of the metadata stored for an IVN within which the VNI is being used, and a SecuritySettingsApplied message 835 may be sent to the client in at least one embodiment. Before delivering a packet to a CI to which the VNI is attached, the VCS may ensure that the security settings of the VNI would not be violated by the delivery in various embodiments. Similarly, before delivering an outbound packet originating at a CI to which the VNI is attached, the VCS may ensure that the security settings of the VNI would not be violated by the delivery.

According to some embodiments, a client 810 may request that an address range assigned to a VNI or a CI be transferred (e.g., in an atomic operation) to another VNI or CI, by submitting a TranferAddressRange request 837. The address range may be transferred as requested, and an AddressRangeTranferred response message 839 may be sent to the client in some embodiments. It is noted that programmatic interactions other than those shown in FIG. 8, pertaining to the assignment and use of multiple address ranges to a single resource, may be supported by a VCS in at least some embodiments, while some of the interactions shown in FIG. 8 may not be supported in at least one embodiment.

Figure 9:
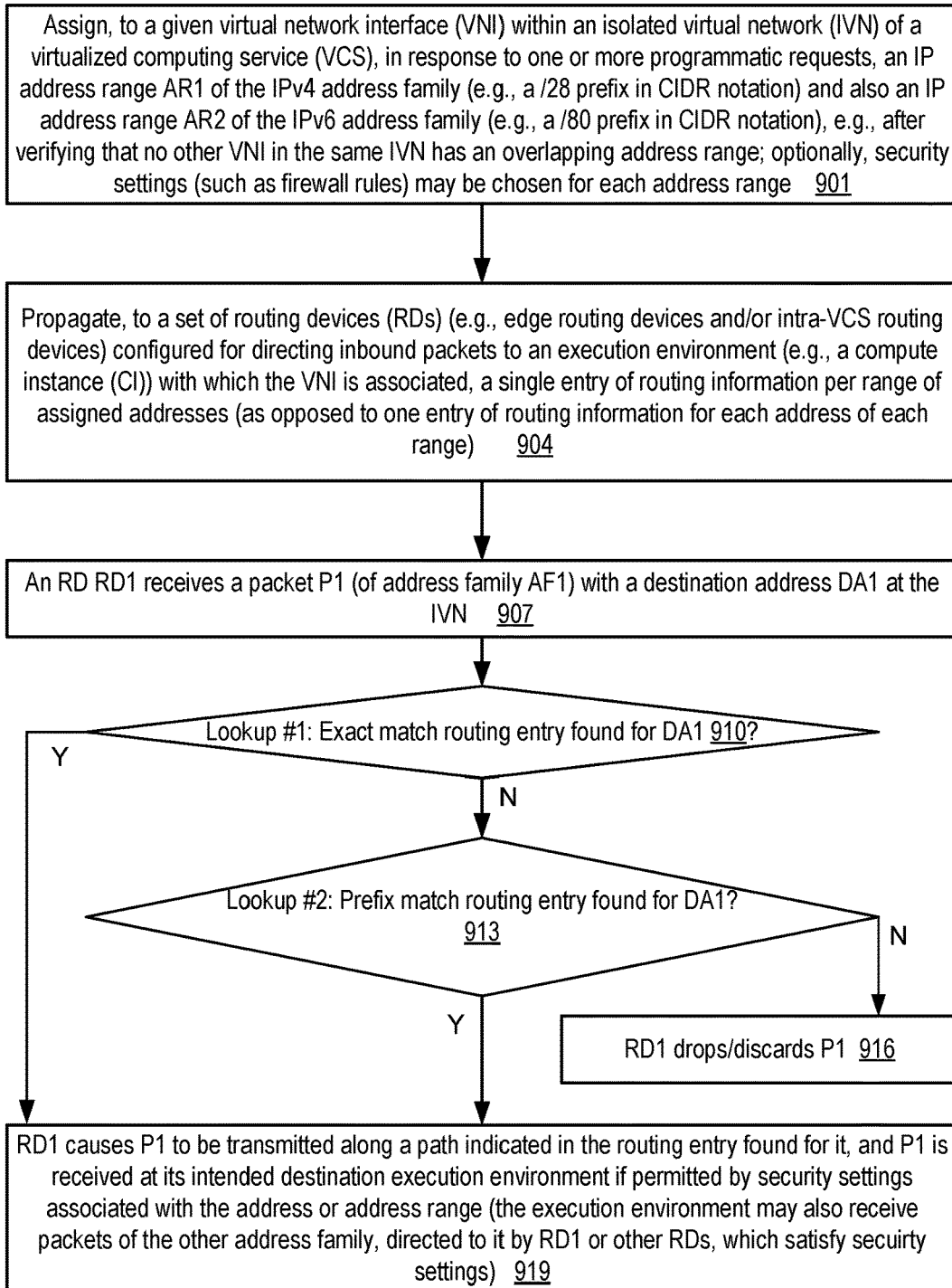
FIG. 9 is a flow diagram illustrating aspects of operations that may be performed to route network packets in a scenario in which ranges of network addresses of multiple address families may be assigned to individual virtual network interfaces of compute instances, according to at least some embodiments.

FIG. 9 is a flow diagram illustrating aspects of operations that may be performed to route network packets in a scenario in which ranges of network addresses of multiple address families may be assigned to individual virtual network interfaces of compute instances, according to at least some embodiments. As shown in element 901, in response to one or more programmatic requests, an IP address range AR1 of the IPV4 address family (e.g., a /28 prefix in CIDR notation) and also an IP address range AR2 of the IPV6 address family (e.g., a /80 prefix in CIDR notation) may be assigned to a given virtual network interface (VNI) within an isolated virtual network (IVN) of a virtualized computing service (VCS). Before assigning the address ranges, in various embodiments the VCS may verify that no other VNI in the same IVN has an overlapping address range. In at least some embodiments, security settings (similar to firewall rules) may optionally be chosen for each address range, either at the time that the ranges are assigned to a VNI or later.

To a set of routing devices (RDs) (e.g., edge routing devices and/or intra-VCS routing devices) configured for directing inbound packets to an execution environment (e.g., a compute instance (CI)) with which the VNI is associated), a single entry of routing information per range of assigned addresses may be propagated in the depicted embodiment (element 904) (as opposed, for example, to one entry of routing information for each address of each range). The total number of bytes of routing information that is propagated is thus proportional to the number of distinct ranges assigned, and not to the total number of distinct addresses assigned.

A routing device RD1 may receive a packet P1 of address family AF1 with a destination address DA1 within the IVN in the depicted embodiment (element 907). At most two lookups may be performed at RD1 to identify a next hop to which P1 should be directed. The first lookup may be an exact match lookup, in which the entire destination address DA1 may be matched against the individual addresses stored in a database of routing information maintained at RD1. If an exact match routing entry is not found for DA1 (as detected in element 910), RD1 may attempt a prefix-match lookup, in which depending on the address family, the /28 or /80 prefix corresponding to DA1 is looked up in the database. If neither lookup results in a match (elements 910 and 913), RD1 may drop or discard the packet P1 in at least some embodiments (element 916).

If either of the lookups succeed, RD1 may cause P1 to be transmitted along a path in the routing entry found in the lookup (element 919). P1 may be received at its intended destination execution environment or CI, if permitted by security settings associated with the address or address range in the routing information entry used in the depicted embodiment. The execution environment may also receive packets of the other address family whose address range is assigned to the VNI, e.g., after the packets are routed by RD1 or other RDs, as long as the other packets also satisfy the security settings.

Figure 10:
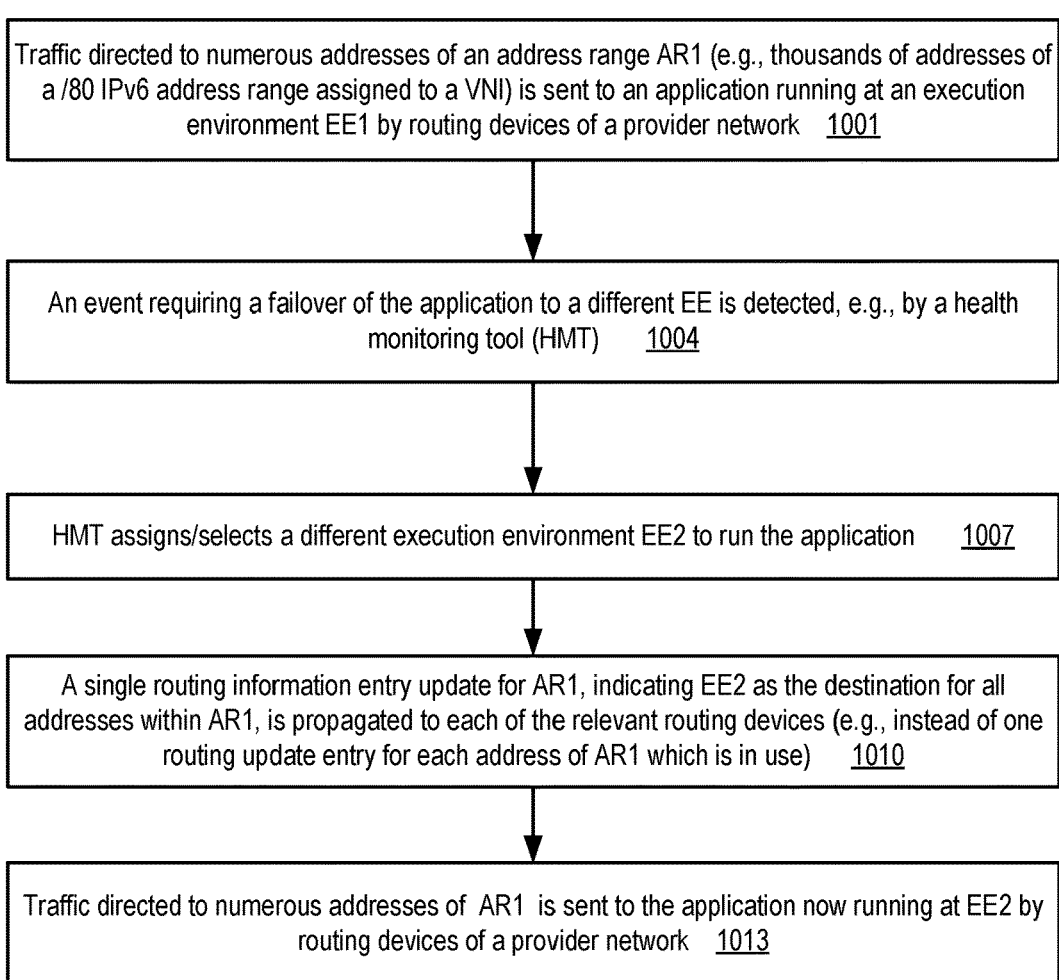
FIG. 10 is a flow diagram illustrating aspects of efficient failover of applications in a scenario in which ranges of network addresses of multiple address families may be assigned to individual virtual network interfaces of compute instances, according to at least some embodiments.

FIG. 10 is a flow diagram illustrating aspects of efficient failover of applications in a scenario in which ranges of network addresses of multiple address families may be assigned to individual virtual network interfaces of compute instances, according to at least some embodiments. As shown in element 1001, network traffic directed to numerous addresses of an address range AR1 (e.g., thousands of addresses of a /80 IPv6 address assigned to a VNI) may be sent to an application running at an execution environment EE1 (such as a compute instance or CI) by routing devices of a provider network, e.g., using a small number of lookups directed to their respective routing information databases for each packet as discussed above.

An event requiring or triggering a failover of the application to a different execution environment may be detected in the depicted embodiment (element 1004). Networking failures, hardware failures, and/or software errors/hangs may represent examples of such events, which may for example be detected by a health monitoring tool (HMT) implemented at the VCS control plane in some embodiments.

The HMT may configure, assign or select a different execution environment EE2 to run the application (element 1007). A single routing information entry update may be required for AR1, indicating EE2 as the destination for all addresses within AR1. The update may be propagated to each of the relevant routing devices (element 1010); as such, routing information updates per individual address of AR1 which is in use may not be needed. After the routing update is propagated, traffic directed to numerous addresses of AR1 may be sent to EE2 by the routing devices (element 1013). Such efficient propagation of routing updates may be particularly beneficial for telecommunication applications and other applications in which failovers may have to meet stringent latency constraints. For example, it may take just a few milliseconds to update the routing information if the updates are performed at via one message per range rather than one message per address, while it may take several hundreds of seconds if tens of thousands of individual per-address updates are required.

Figure 11:
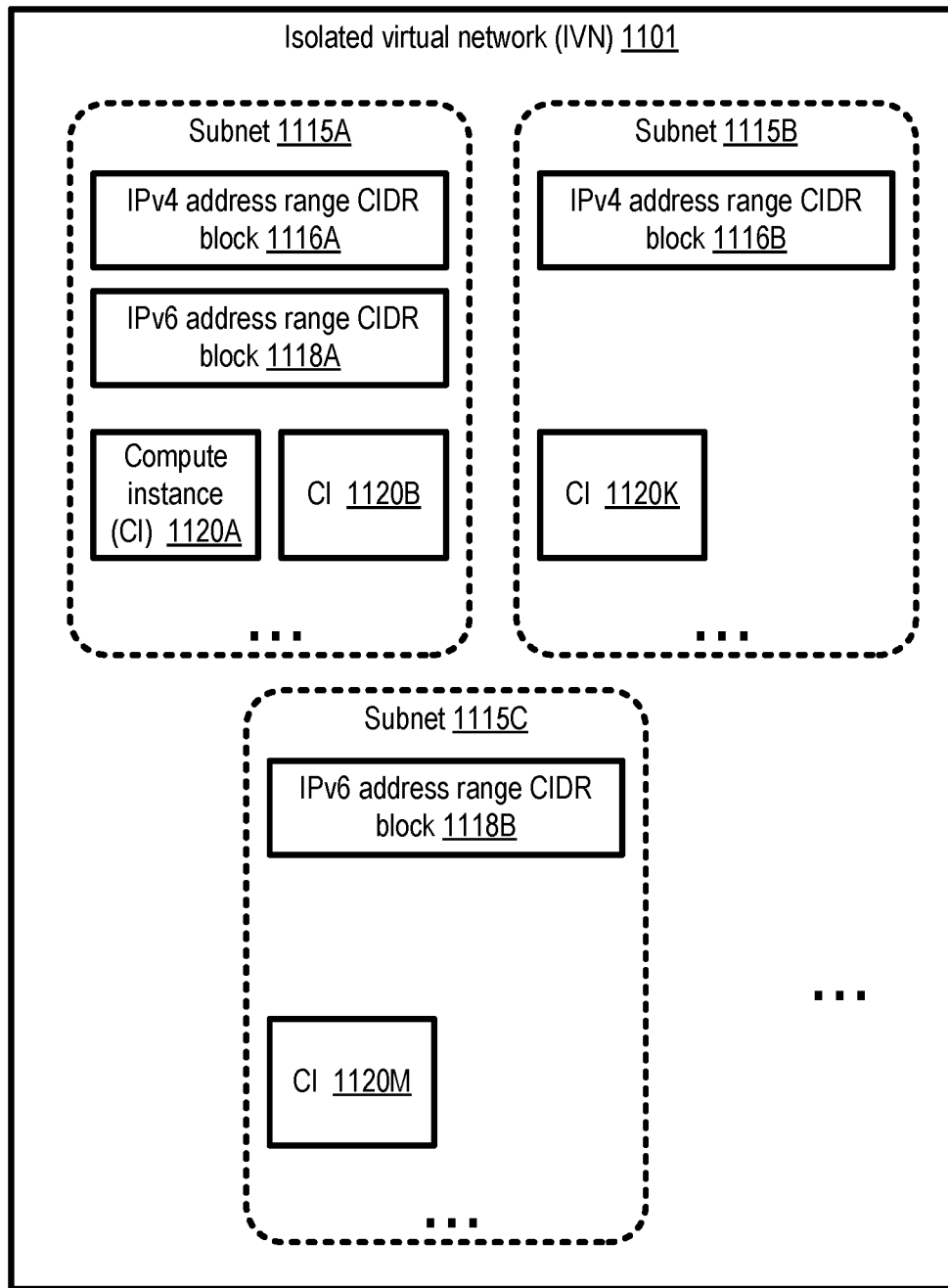
FIG. 11 illustrates an isolated virtual network comprising several subnets with respective client-selected address ranges within one or more address families, according to at least some embodiments.

FIG. 11 illustrates an isolated virtual network comprising several subnets with respective client-selected address ranges within one or more address families, according to at least some embodiments. A client on whose behalf isolated virtual network (IVN) 1101 was established has requested the establishment of three subnets in the example scenario shown in FIG. 11. When requesting establishment of an IVN, a client may select an overall IVN-level address range usable for the IVN as a whole, expressed for example as a CIDR block within an address family. Then, when requesting establishment of a subnet, a VCS client may indicate at least one range of IP addresses which is part of the overall IVN range, also expressed using a CIDR block, for the subnet in the depicted embodiment. Multiple subnets may be established by a VCS client within respective availability zones of the provider network in some embodiments, enabling the client to make their applications resilient to failures in any given availability zone and to make distinct networking configuration choices in the different availability zones if desired. Multiple subnets may be established within a single availability zone as well, e.g., for isolating different groups of applications.

For subnet 1115A of IVN 1101, the client has indicated an IPV4 CIDR address block 1116A, representing a range of IPV4 addresses that can be assigned to resources such as compute instances (CIs) 1120A or 1120B within the subnet. The client has also indicated an IPV6 CIDR address block 1118A for subnet 1115A, representing a range of IPV4 addresses that can be assigned to resources such as CIs 1120A or 1120B. For subnet 1115B, the client has chosen to specify a single IPv4 address range CIDR block 1116B, from which addresses can be assigned to resources such as CI 1120K configured within subnet 1115B. For subnet 1115C, the client has chosen to specify only an IPV6 address range CIDR block 1118B, to be used for resources such as CI 1120. In some embodiments, the VCS may limit the sizes of the address ranges that a client can choose for an IVN or for an individual subnet within an IVN—e.g., a an IVN may be set up with a client-selected /16 IPv4 address range, and as subnet within an IVM may be set up with a client-selected /20 IPv4 address range.

Figure 12:
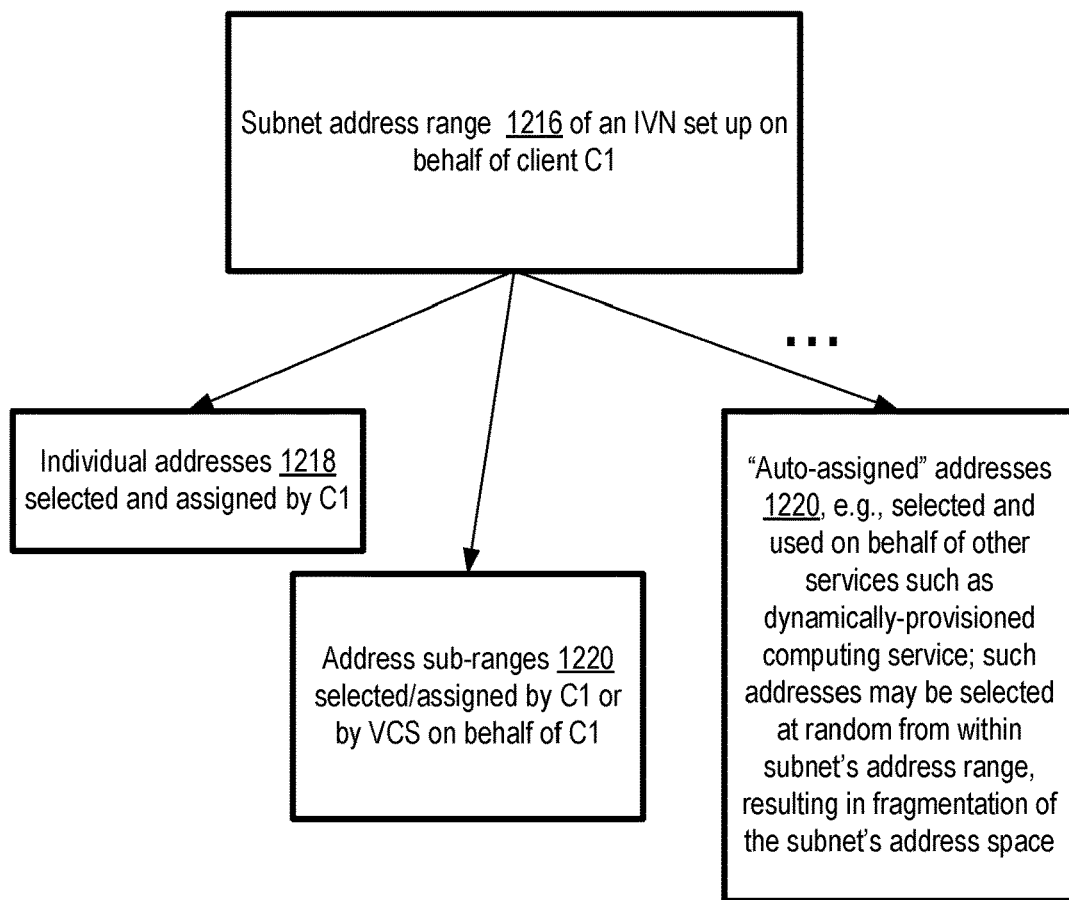
FIG. 12 illustrates examples of types of operations for which addresses of a subnet may be selected and used, according to at least some embodiments.

FIG. 12 illustrates examples of types of operations for which addresses of a subnet may be selected and used, according to at least some embodiments. From an address range 1216 of a subnet within an IVN set up on behalf of a client C1 of a VCS, some individual addresses 1218 may be selected and assigned by C1, e.g., to VNIs attached to CIs. Client C1 may also choose address sub-ranges 1220 of the subnet's address range and assign the sub-ranges to individual VNIs or CIs as discussed earlier by submitting range assignment requests similar to those discussed earlier, e.g., AssignSpecifiedAddressRangesToVNI requests 817 of FIG. 8. In some cases, as when a client submits the equivalent of an AssignVCSSelectedAddressRangeToVNI request 821 of FIG. 8, the VCS may choose a sub-range of an address family on behalf of the client. Note that to ensure that the distribution/propagation of routing information entries is efficient, and that the lookups performed at the routing devices are efficient, contiguous blocks of IP addresses may have to be assigned to VNIs and CIs in various embodiments. Thus, for example, when a /28 block of IPV4 addresses is assigned to a VNI, a single routing information entry for 16 addresses may be propagated and used at the routing devices; assigning two blocks of 8 addresses each, four blocks of 4 addresses each, etc. would not be as efficient, as more routing information messages may have to be propagated, and stored at the routing devices. As such, having the ability to select and assign large contiguous ranges of addresses of desired sizes may be important in various embodiments.

Some types of operations performed at a VCS may require network addresses within an IVN to be assigned automatically, i.e., without the explicit specification of the addresses by the clients on whose behalf the operations are performed. For example, to execute computations or functions requested by client C1 from a server-less dynamically provisioned computing service, network addresses within a subnet set up by C1 may be chosen and assigned to the resources (such as service-created CIs) used for the computations, without requiring C1 to specify any network addresses. Such "auto-assigned" addresses may be selected at random from within a subnet address range 1216 of the client, thus resulting in fragmentation of the subnet's address space. Addresses may also be randomly selected and auto-assigned from within a subnet for other purposes in various embodiments, such as for extension traffic intermediaries set up for communications with VCS extension sites of the kind shown in FIG. 5. If a sufficient number of randomly-distributed addresses are auto-assigned from the subnet's address space, it may not be easy to find an unused contiguous address sub-range of a size desired by client C1 for assignment to a VNI or a CI. To address such concerns, the VCS may enable clients to reserve subnet address sub-ranges for specified types of operations in at least some embodiments.

Figure 13:
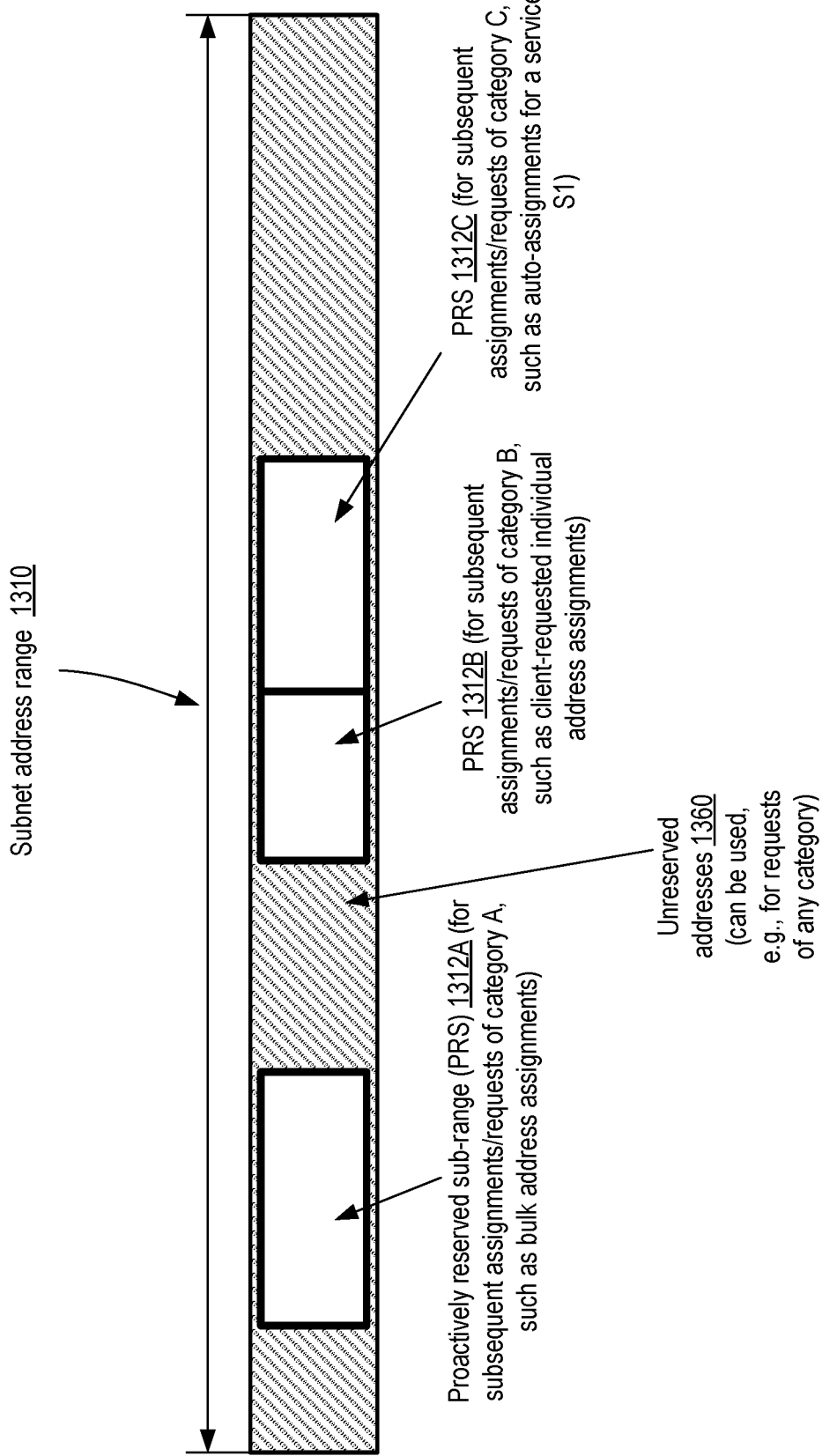
FIG. 13 illustrates example pro-active client-initiated reservations of portions of the address range of a subnet, according to at least some embodiments.

FIG. 13 illustrates example pro-active client-initiated reservations of portions of the address range of a subnet, according to at least some embodiments. In the example scenario shown in FIG. 13, a subnet address range 1310 has been logically subdivided into four groups of addresses at the request of a client. Proactively reserved sub-range (PRS) 1312A has been reserved for future assignments/requests of a particular category A, such as bulk address assignment requests (single requests for assignment of a plurality of contiguous addresses) from the client. PRS 1312B has been reserved for subsequent assignments/requests of category B, such as client-requested individual address assignments. PRS 1312C has been set aside for assignments/requests of a category C, such as auto-assignments on behalf of a service S1. The unreserved addresses 1360 may be used for requests of any category in the depicted embodiment.

In the embodiment depicted in FIG. 13, after a sub-range of the subnet's addresses has been reserved for a particular purpose, addresses within that sub-range may only be used for that purpose, even if they are not actually in use at the time that they are requested. For example, if a request to assign an address A.B.C.D within PRS 1312A to a VNI is received, and the assignment does not belong to category A, the request may be rejected even if A.B.C.D is not currently assigned to any resource or device. Proactive reservations may be made for addresses of any address family for which an address range has been chosen for a subnet in various embodiments—e.g., IpV4 sub-ranges of a given subnet may be reserved, IPv6 sub-ranges of the given subnet may be reserved, or both IPv4 and IPv6 addresses may be reserved. Multiple sub-ranges may be reserved at a given subnet for a given category of operations or requests in some embodiments. In some embodiments, clients of a VCS may reserve address ranges at an IVN level rather than at a subnet level—that is, sub-ranges of the overall address range of an IVN may be reserved for a specified purpose, regardless of the specific subnet(s) with which those addresses are associated.

According to at least some embodiments, hierarchical reservations of network addresses may be supported for at least some subnets of an isolated virtual network. A client C1 of a VCS may request a top-level reservation for a sub-range SR1 of a subnet's address range for fulfilling requests for one or more categories of operations from a set of authorized users UserSet1, where the permitted categories of operations include making additional reservations for a portion of sub-range R1. An authorized user U1 of UserSet1 may submit a second-level reservation request, causing the VCS to store metadata indication that a sub-range SR2 of SR1 has been reserved for one or more categories of operations requested by a set of authorized users UserSet2. In some embodiments, when making such a second level reservation, only the types of operations that were permitted in the first-level reservation (or a subset of those types) may be allowed for the second-level reservation, and the set of users (UserSet2 in the above example) authorized to use the second-level reservation may be required to be a subset of the set of users authorized to use the first-level reservation (UserSet1 in the above example). In other embodiments, such constraints may not apply, e.g., any desired types of supported operations may be permitted for second-level reservations, and/or any desired set of users may be permitted to use the second-level reservations. Multiple levels of reservations may be supported in some embodiments.

Figure 14:
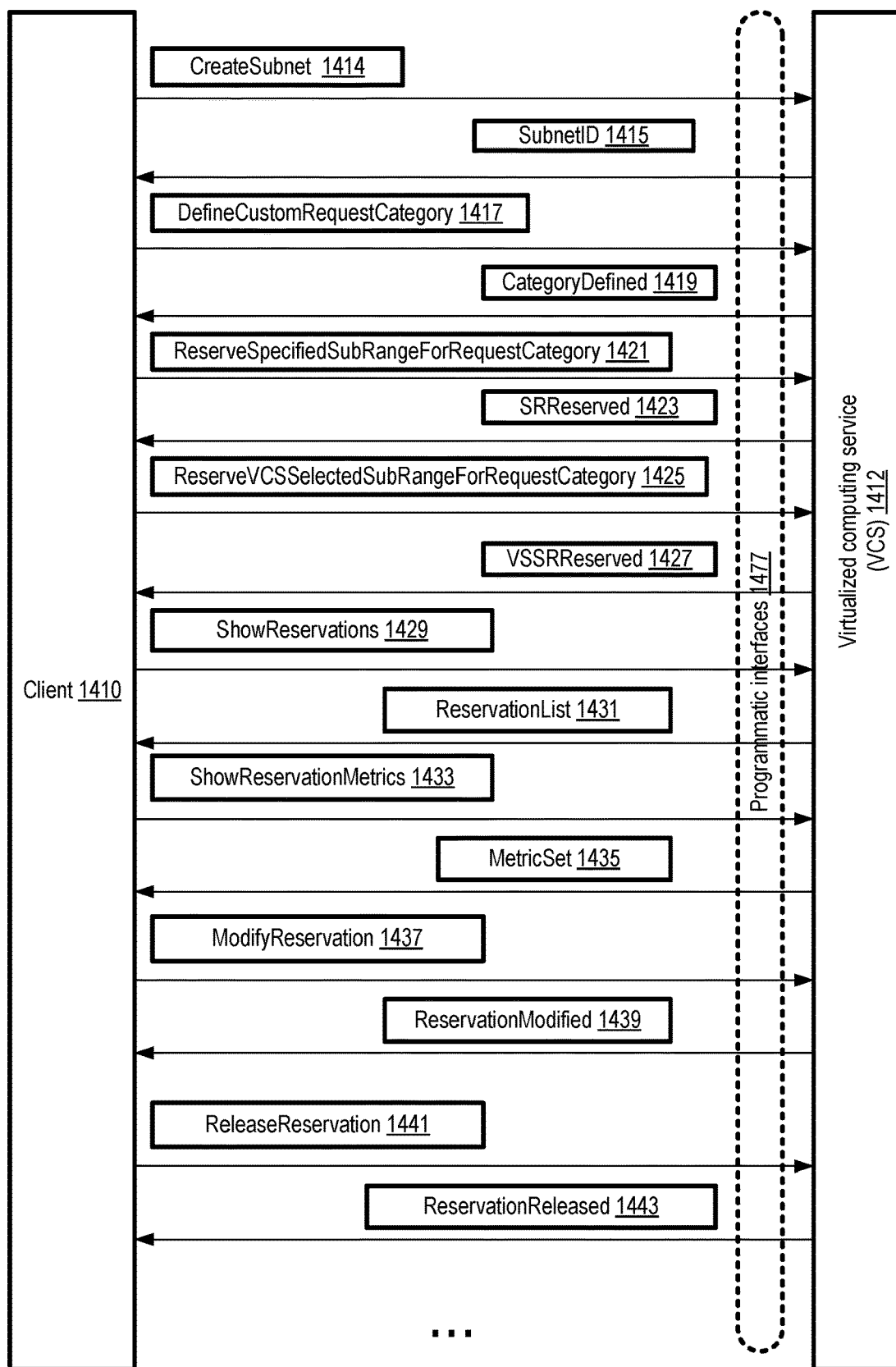
FIG. 14 illustrates example programmatic interactions between clients and a virtualized computing service, pertaining to the reservation of subnet addresses, according to at least some embodiments.

FIG. 14 illustrates example programmatic interactions between clients and a virtualized computing service, pertaining to the reservation of subnet addresses, according to at least some embodiments. A VCS 1412, similar in features and functionality to VCS 102 of FIG. 1, may implement a set of programmatic interfaces 1477 to enable clients 1410 to submit programmatic requests pertaining to reservations of subnet addresses in the depicted embodiment. The programmatic interfaces 1477 may include, for example, web-based consoles, command-line tools, APIs, graphical user interfaces and the like.

A client 1410 may submit a CreateSubnet request 1414 via the programmatic interfaces 1477, specifying the isolated virtual network (IVN) within which the subnet is to be created. In some cases the client may also specify one or more ranges of network addresses which can be assigned to devices within the subnet in the CreateSubnet request. For example, an IPV4 address range, an IPV6 address range, or address ranges in both address families may be specified for the subnet by the client using CIDR notation. In one embodiment, if the client does not specify an address range in the request to create a subnet, the VCS may choose an address range of one or both address families for the subnet. Metadata indicating the properties of the subnet (e.g., the name of the subnet and one or more address ranges of the subnet) may be stored at the VCS 1412, and a SubnetID message 1415 comprising an identifier of the created subnet may be sent to the client in some embodiments.

According to some embodiments, a client may define a customized category of requests for which reservations of subnet address subsets can be made, e.g., by submitting a DefineCustomRequestCategory request 1417 to the VCS. Such a custom request category may, for example, indicate a name selected for the custom request category, a set of users authorized to submit the custom requests, a subset of VNIs or compute instances of an IVN which can be assigned network addresses via requests of the custom category, and so on. The VCS may store a definition of the custom request category and send a Category Defined message 1419 to the client. Subsequently, when a reservation request for an address range is received, specifying a category of requests which can be fulfilled using a to-be-reserved address range, the VCS may verify that the category belongs to a set of pre-defined or default categories (e.g., bulk address assignment, client-requested individual address assignment, etc.) or to a set of custom categories defined earlier. When a request for an assignment of one or more addresses from a reserved range is received, the VCS may approve the request if it belongs to a category (either pre-defined or custom) which is permitted for the reservation.

A client 1410 may submit at least two types of reservation requests for address ranges within a subnet in the depicted embodiment. If the client wished to specify the sub-range of the subnet address space which is to be reserved, e.g., using CIDR notation for the address family for which the reservation is being requested, the client may submit a ReserveSpecifiedSubRangeForRequestCategory request 1421. If the client simply wishes to indicate that a certain number of consecutive addresses are to be reserved (e.g., using the portion of the CIDR notation which indicates the number of bits which are fixed for the sub-range, such as /24 for IPV4 or /80 for IPV6), but does not wish to indicate the exact range of addresses, a ReserveVCSSelectedSubRangeForRequestCategory request 1425 may be submitted. In either case, one or more request categories may be specified in the reservation request, indicating which type(s) of requests the VCS is permitted to fulfill, or which types of operations the VCS is permitted to perform, using the reserved range of addresses. In some embodiments, a client may also indicate a set of authorized users (e.g., with user identifiers associated with the client account for which the IVN and subnet were created) permitted to use the reserved address sub-range.

In response to a ReserveSpecifiedSubRangeForRequestCategory request 1421, the VCS may store metadata indicating that the specified sub-range of addresses has been reserved after verifying that (a) none of the addresses of the specified sub-range are currently in use and (b) none of the addresses of the specified sub-range are currently reserved in various embodiments. If either of these conditions do not hold, the VCS may reject the reservation request in at least some embodiments. In one embodiment, a message indicating the reasons why the reservation request was rejected (e.g., due to an address being in-use, or due to a conflicting reservation) may be provided to the client. If the reservation request is successful, an SRReserved message 1423 confirming the reservation may be sent to the client in some embodiments.

In response to a ReserveVCSSelectedSubRangeForRequestCategory request 1425, the VCS may first try to find an un-reserved and currently un-used address sub-range of a size indicated in the request (or, if the client does not specify the sub-range size, a default sub-range size for the address family indicated in the request). If such a sub-range is available in the subnet, it may be selected by the VCS to fulfil the request; if such a sub-range is not available, an error message indicating that the reservation request failed may be sent to the client. In the scenario in which an appropriate sub-range is found, the VCS may store metadata indicating that the selected sub-range of addresses has been reserved for the request category or categories specified, and a VSSRReserved message 1427 indicating the reserved sub-range may be sent to the client.

A client may view the address sub-range reservations currently in effect for a specified subnet or subnets of an IVN by submitting a ShowReservations request 1429 in some embodiments. A list of the reservations made for address sub-ranges of the IVN, indicating the specific sub-ranges reserved, may be presented to the client via a ReservationsList message 1431 in the depicted embodiment.

The VCS may collect various types of metrics pertaining to address-range reservations in some embodiments, such as the total number of reservations made per subnet during various time intervals, the fraction of the subnet address space which is reserved in one or more address families during the time intervals, the fraction of the address sub-range of each reservation which is in use during the time intervals, the total number of addresses of a reserved sub-range which are in use during the time intervals, and so on. In response to a submitted ShowReservationMetrics request 1433, some or all of the collected metrics for one or more reservations indicated by the client or associated with the client may be provided via one or more MetricSet messages 1435 in the embodiment depicted in FIG. 14. In some embodiments, the request for reservation metrics may indicate a time period (e.g., most-recent-15-minutes, or 9:00 AM-to-10:00 AM) for which the metrics are requested, and the MetricSet messages may be generated accordingly.

A client may change one or more parameters of a previously-created reservation by submitting a ModifyReservation request 1437 in the embodiment shown in FIG. 14. For example, the sub-range of addresses may be changed, the types of requests that can be fulfilled using the reservation may be changed, and/or the set of users or provider network services allowed to obtain addresses from the reservation may be changed. In some embodiments, if the requested change cannot be applied immediately (e.g., if some addresses of the currently reserved sub-range are already in use for a type of request that is no longer going to be permitted after the requested change is applied), the VCS may notify the client that the change will take effect when it becomes possible to do so. A ReservationModified message 1439 may be sent to the client to indicate that the modification has been accepted; in some cases, the notification as to whether the modification can be applied immediately or has to be deferred may be included in the ReservationModified message 1439.

A client may release or cancel an existing reservation by submitting a ReleaseReservation request 1441 in some embodiments. In response, metadata indicating the reservation may be marked for deletion or deleted at the VCS, a ReservationReleased message 1443 may be sent to the client, and subsequent requests for addresses from the previously reserved sub-range may no longer be checked to verify that they do not violate the reservation. For example, a request for an assignment of an address Addr1, which was rejected earlier because its request category was not among the categories for which a reservation was made, may be accepted if it is re-submitted after the reservation is released. It is noted that programmatic interactions other than those shown in FIG. 14, pertaining to proactive reservations of subnet address sub-ranges, may be supported by a VCS in at least some embodiments, while some of the interactions shown in FIG. 14 may not be supported in at least one embodiment.

Figure 15:
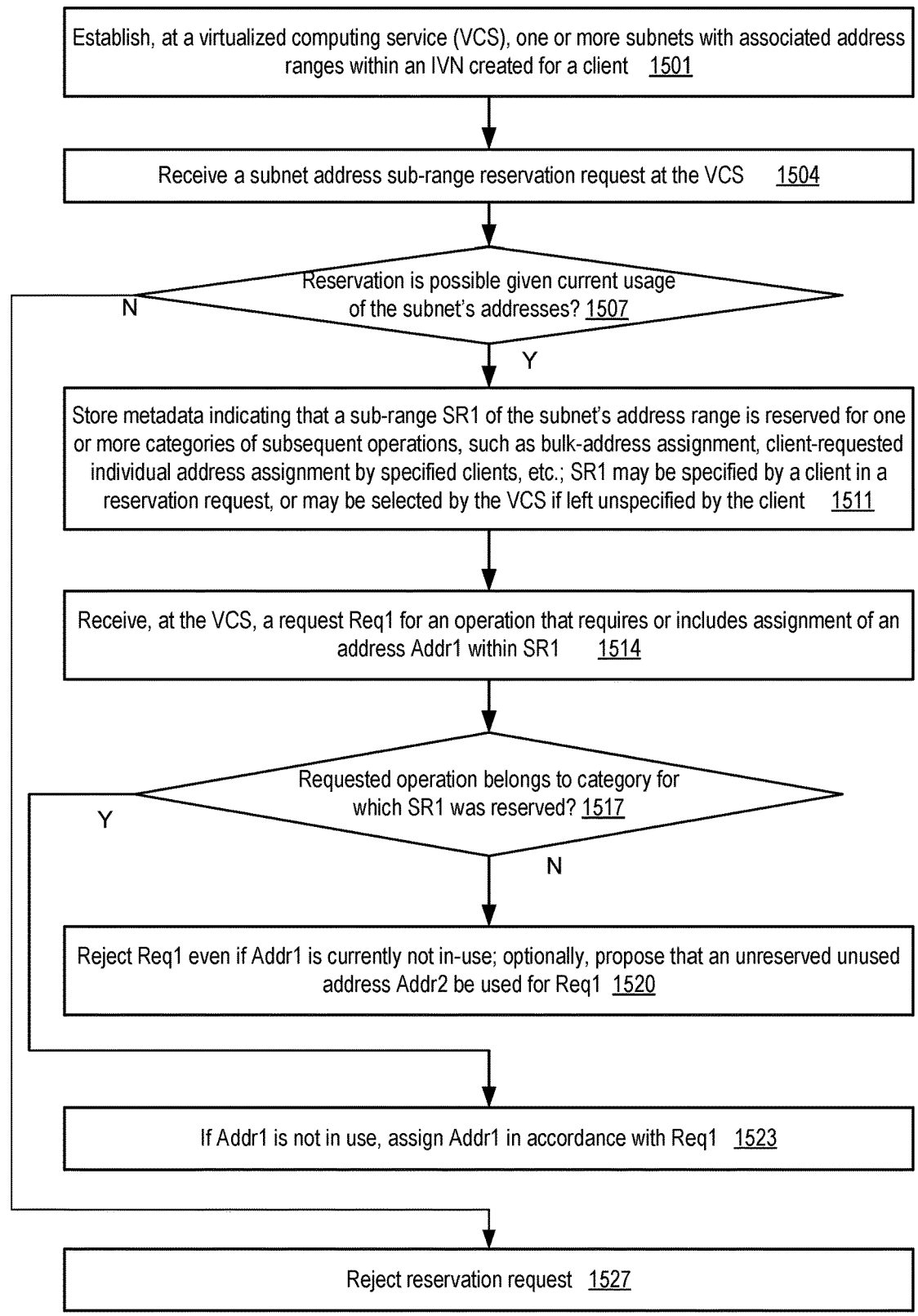
FIG. 15 is a flow diagram illustrating aspects of operations that may be performed to proactively reserve and utilize addresses from the range of addresses of a subnet, according to at least some embodiments.

FIG. 15 is a flow diagram illustrating aspects of operations that may be performed to proactively reserve and utilize addresses from the range of addresses of a subnet, according to at least some embodiments. As shown in element 1501, one or more subnets with respective associated address ranges may be established within an IVN of a client of a VCS similar in functionality to VCS 102 of FIG. 1. A subnet address sub-range reservation request may be received at a VCS (element 1504).

In response to the reservation request, the VCS may perform one or more checks to verify that the reservation is feasible—e.g., whether an unused sub-range of the desired size indicated in the reservation request is available, or whether the exact sub-range of addresses indicated in the reservation request is available, and so on. If the results of the checks or verification operations indicate that a reservation that would satisfy the reservation request is feasible, given the current usage of the subnet's addresses (as detected in operations corresponding to element 1507) metadata indicative of a successfully made reservation may be stored at the VCS (element 1511). If the reservation is not feasible, in various embodiments the reservation request may be rejected (element 1527). Note that when checking whether the requested reservation is feasible, the VCS may have to take into account address that are currently assigned to devices such as VNIs within the subnet, and also any existing reservations which might conflict with the requested reservation. If the decision to accept or approve the reservation is made, metadata indicating that a sub-range SR1 of a subnet's address range is reserved for one or more categories of subsequent operations, such as bulk-address assignment, client-requested individual address assignment by specified clients, etc. may be stored in various embodiments. SR1 may be specified by a client in a reservation request, or may be selected by the VCS if left unspecified by the client (e.g., if the client only specifies the size of the desired reserved sub-range, but does not specify the exact address sub-range to be reserved). The category or categories of subsequent requests or operations for which the reserved sub-range may be used may be indicated in the reservation request in at least some embodiments. In the depicted embodiments, multiple reservations at the same subnet may be made for future requests of a given set of one or more request categories, e.g., in response to respective reservation requests. In various embodiments, respective reservations at the same subnet may be made for different categories of requests or operations—e.g., one sub-range of a subnet S1's address range may be reserved for subsequent bulk address assignments, another sub-range of S1's address range may be reserved for client-requested individual address assignments, a third sub-range of S1's address range may be reserved for a custom request category created by the client, and so on.

A request Req1 for an operation that requires or includes assignment of at least one address Addr1 within the reserved sub-range SR1 may be received at the VCS (element 1514) at some point after the reservation is made. If the requested operation does not belong to the category of operation for which SR1 was reserved, or Req1 does not belong to a category of requests for whose fulfillment SR1 was reserved (as determined in operations corresponding to element 1517), Req1 may be rejected in various embodiments even if Addr1 is currently not in use within the parent IVN of the subnet (element 1520). As such, Req1 may be received and rejected during a time interval in which Addr1 is not in use and is hence available for at least other requests. If the VCS is able to find an alternative address or addresses (e.g., unreserved addresses within the same subnet) that could be used to fulfill Req1, in some embodiments the VCS may notify the submitter of Req1 accordingly—e.g., by providing an unreserved and unused address Addr2 that can be used instead of Addr1. In some cases, assignment of a particular address such as Addr1 from within SR1 may be requested by another service of the provider network as part of an auto-assignment operation of the kind discussed in the content of FIG. 12, and may have to be rejected because of a conflict with an existing reservation. That is, some other service such as a container management service or a serverless dynamically provisioned computing service may determine that in order to fulfill a request from a client on whose behalf the subnet was created, an address has to be chosen and used by that other service, and the address chosen by the other service may happen to lie within the reserved range SR1.

If the requested operation belongs to the category of operation for which SR1 was reserved, or Req1 belongs to a category of requests for whose fulfillment SR1 was reserved (as also determined in operations corresponding to element 1517), and if Addr1 is not in use, Addr1 may be assigned to one or more devices (e.g., a VNI and/or a compute instance or virtual machine) in accordance with Req1 in the depicted embodiment (element 1523). If Addr1 is in use, or if at least some addresses of a requested range of addresses indicated in Req1 are in use, Req1 may also be rejected in various embodiments. Note that requests for bulk address assignment (assignment of ranges of contiguous addresses to a VNI or a compute instance, with the range being specified by a client or chosen by the VCS), requests for client-requested single address assignments, as well as requests of custom categories defined by the client, may all be processed at the VCS while taking reservations into account. The requests such as Req1 may be for addresses or address ranges of any of the address families (such as IPv4 or IPv6) whose addresses are assigned to the subnet, e.g., at the time of subnet creation.

It is noted that in various embodiments, some of the operations shown in FIG. 9, FIG. 10 and/or FIG. 15 may be implemented in a different order than that shown in the figure, or may be performed in parallel rather than sequentially. Additionally, some of the operations shown in FIG. 9, FIG. 10 and/or FIG. 15 may not be required in one or more implementations.

Figure 16:
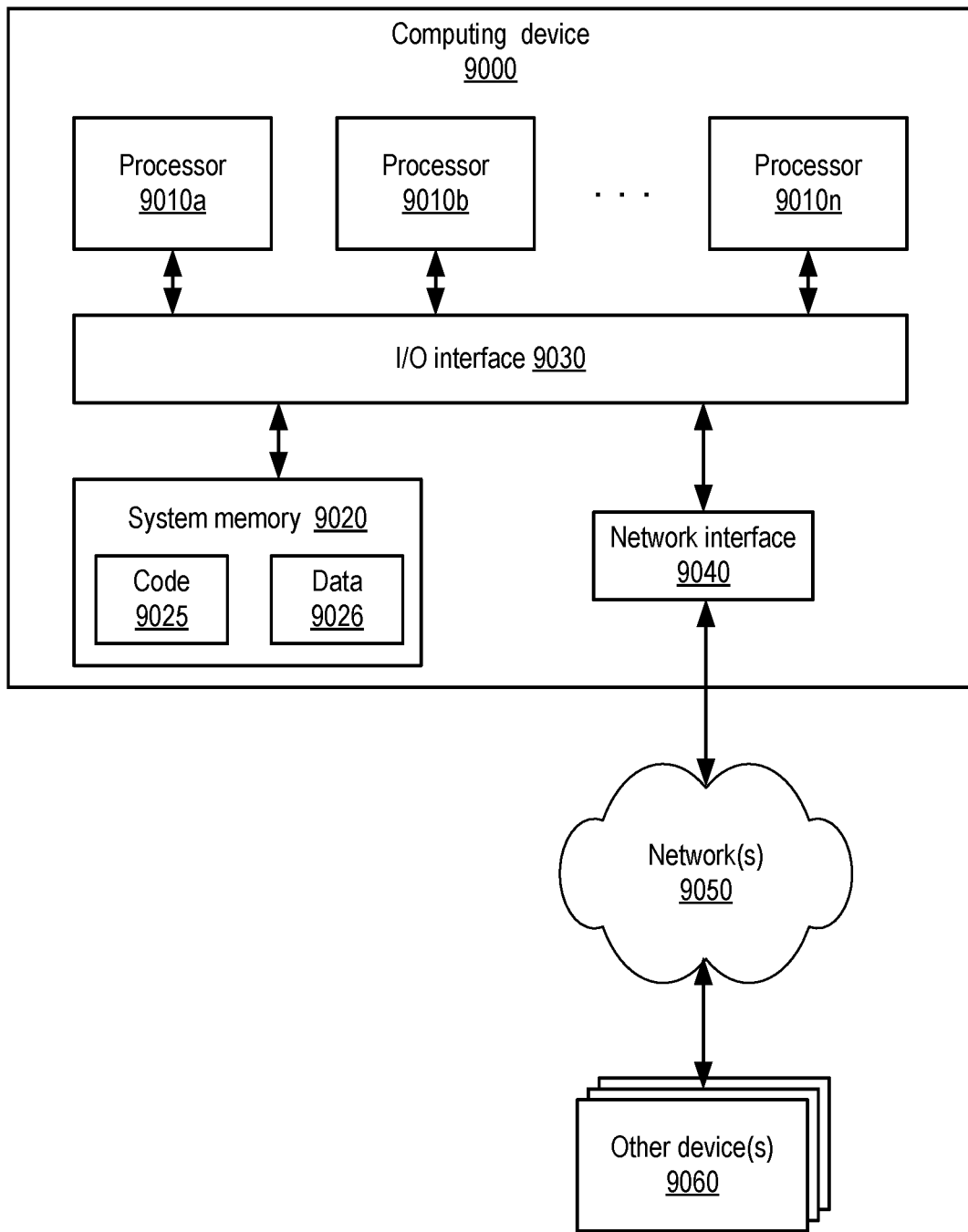
FIG. 16 is a block diagram illustrating an example computing device that may be used in at least some embodiments.

In at least some embodiments, a server that implements the types of techniques described herein (e.g., various functions of a VCS or other services of a provider network), may include a general-purpose computer system that includes or is configured to access one or more computer-accessible media. FIG. 16 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 15, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 15. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 16 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
   a virtual network interface;
   a compute instance to which the virtual network interface is programmatically attached;
   a routing device; and
   one or more computing devices implementing a virtualized computing service that manages the compute instance, the virtualized computing service configured to:
      assign, to the virtual network interface in response to one or more or programmatic requests received at the virtualized computing service, (a) a first range of network addresses of a first address family and (b) a second range of network addresses of a second address family;
      propagate, to the routing device, a first routing information entry for routing packets to destination addresses within the first range, and a second routing information entry for routing packets to destination addresses within the second range, wherein routing information entries corresponding to individual addresses of the first range are not propagated to the routing device, and wherein routing information entries corresponding to individual addresses of the second range are not propagated to the routing device; and
      receive, at the compute instance:
         a first packet routed by the routing device using the first routing information entry, wherein the routing device does not use a longest prefix matching algorithm to route the first packet, wherein a destination address of the first packet is within the first range, wherein the first packet is delivered to the compute instance after verifying that the first packet satisfies a security setting of an isolated virtual network within which the compute instance is configured, and wherein the security setting is associated with the first range of network addresses;
  a second packet routed by the routing device using the first routing information entry, wherein a destination address of the second packet is within the first range and wherein the destination address of the second packet differs from the destination address of the first packet; and
  a third packet routed by the routing device using the second routing information entry, wherein a destination address of the third packet is within the second range.

2. The system as recited in claim 1, wherein the one or more programmatic requests (a) do not specify the first range of network addresses and (b) indicate that the virtualized computing service is to select the first range of network addresses.

3. The system as recited in claim 1, wherein the routing device is configured to:
  in response to receiving the first packet, perform an exact match lookup for a destination address of the first packet, wherein the exact match lookup is performed within a collection of routing information entries of the routing device; and
  in response to determining that a routing information entry was not found in the collection by the exact match lookup, perform a prefix-based lookup within the collection, wherein the first routing information entry is found by the prefix-based lookup and used to route the first packet.

4. The system as recited in claim 1, wherein the virtualized computing service is further configured to:
  store metadata, in response to receiving a reservation request prior to assigning the first range of network addresses, indicating that a third range of network addresses has been reserved for bulk address assignments, wherein the third range of network addresses includes at least the first range of network addresses; and
  select, from the third range of network addresses, the first range of network addresses for assignment to the virtual network interface.

5. The system as recited in claim 1, wherein the virtualized computing service is further configured to:
  assign an additional network address of the first address family to the virtual network interface, wherein the additional network address is not in the first range of network addresses; and
  receive, at the compute instance to which the virtual network interface is attached, a network packet whose destination address is the additional network address.

6. A computer-implemented method, comprising:
  assigning, to a virtual network interface, (a) a first set of network addresses of a first address family and (b) a second set of network addresses of a second address family;
  storing, at a routing device, a first routing information entry for routing packets to destination addresses within the first set, and a second routing information entry for routing packets to destination addresses within the second set, wherein routing information entries corresponding to individual addresses of the first set are not stored at the routing device, and wherein routing information entries corresponding to individual addresses of the second set are not stored at the routing device; and
  obtaining, at a first execution environment with which the virtual network interface is programmatically associated:
    a first packet routed by the routing device using the first routing information entry, wherein a destination address of the first packet is a member of the first set; and
    a second packet routed by the routing device using the second routing information entry, wherein a destination address of the second packet is a member of the second set.

7. The computer-implemented method as recited in claim 6, further comprising:
  in response to receiving the first packet at the routing device, performing, at the routing device, an exact match lookup for a destination address of the first packet, wherein the exact match lookup is performed within a collection of routing information entries of the routing device; and
  in response to determining that a routing information entry was not found in the collection by the exact match lookup, performing, at the routing device, a prefix-based lookup within the collection, wherein the first routing information entry is found by the prefix-based lookup.

8. The computer-implemented method as recited in claim 6, further comprising:
  receiving, via a programmatic interface prior to assigning the first set of network addresses, an indication of a number of network addresses to be included in the first set of network addresses.

9. The computer-implemented method as recited in claim 6, further comprising:
  receiving, via a programmatic interface prior to assigning the first set of network addresses, an indication of the first set of network addresses, wherein the indication is expressed using CIDR (Classless Inter-Domain Routing) notation.

10. The computer-implemented method as recited in claim 6, further comprising:
  transmitting, from the first execution environment to a second execution environment using another packet formatted in accordance with the first address family, an indication that the first execution environment is configured to receive packets formatted in accordance with the second address family, wherein the second packet is sent to the first execution environment after the other packet is received at the second execution environment.

11. The computer-implemented method as recited in claim 6, further comprising:
  assigning, to respective software containers launched within the first execution environment, respective network addresses selected from the first set.

12. The computer-implemented method as recited in claim 6, wherein the first and second sets of network addresses are assigned to the first virtual network interface at a virtualized computing service of a provider network, the computer-implemented method further comprising:
  launching the first execution environment at a server located at a premise external to a data center of the provider network, wherein the first execution environment comprises programs implementing one or more virtualized network functions of a telecommunication application; and processing contents of the first packet at a program implementing a virtualized network function of the one or more virtualized network functions.

13. The computer-implemented method as recited in claim 6, further comprising:
in response to detection of a failure at the first execution environment, propagating a message to the routing device, wherein the message indicates that packets with destination addresses within the first set are to be routed to a second execution environment, and wherein respective messages indicating that packets directed to individual destination addresses within the first set are to be routed to the second execution environment are not propagated to the routing device.

14. The computer-implemented method as recited in claim 6, wherein the routing device is an edge routing device of a virtualized computing service of a provider network, wherein the first execution environment comprises a virtual machine running at a virtualization host of the virtualized computing service, and wherein the first packet is received at the edge routing device from a premise external to the provider network.

15. The computer-implemented method as recited in claim 6, wherein the first address family is the Internet Protocol Version 4 (IPV4) address family, and wherein the second address family is the Internet Protocol Version 6 (IPV6) address family.

16. A non-transitory computer-accessible storage medium storing program instructions that when executed on a processor cause the processor to:
assign, to a virtual machine, (a) a first set of network addresses of a first address family and (b) a second set of network addresses of a second address family;
store, at a routing device, a first routing information entry for routing packets to destination addresses within the first set, and a second routing information entry for routing packets to destination addresses within the second set, wherein routing information entries corresponding to individual addresses of the first set are not stored at the routing device, and wherein routing information entries corresponding to individual addresses of the second set are not stored at the routing device; and
obtain, at the virtual machine:
a first packet routed by the routing device using the first routing information entry, wherein a destination address of the first packet is a member of the first set; and
a second packet routed by the routing device using the second routing information entry, wherein a destination address of the second packet is a member of the second set.

17. The non-transitory computer-accessible storage medium as recited in claim 16, storing further program instructions that when executed on the processor further cause the processor to:
in response to receiving the first packet at the routing device, perform, at the routing device, an exact match lookup for the destination address of the first packet, wherein the exact match lookup is performed within a collection of routing information entries of the routing device; and
in response to determining that a routing information entry was not found in the collection by the exact match lookup, perform, at the routing device, a prefix-based lookup within the collection, wherein the first routing information entry is found by the prefix-based lookup.

18. The non-transitory computer-accessible storage medium as recited in claim 16, storing further program instructions that when executed on the processor further cause the processor to:
receive, via a programmatic interface prior to assigning the first set of network addresses, an indication of a number of network addresses to be included in the first set of network addresses.

19. The non-transitory computer-accessible storage medium as recited in claim 16, storing further program instructions that when executed on the processor further cause the processor to:
receive, via a programmatic interface prior to assigning the first set of network addresses, an indication of the first set of network addresses, wherein the indication is expressed using CIDR (Classless Inter-Domain Routing) notation.

20. The non-transitory computer-accessible storage medium as recited in claim 16, storing further program instructions that when executed on the processor further cause the processor to:
receive, via a programmatic interface prior to assigning the first set of network addresses, an address reservation request indicating a first range of network addresses of the first address family which is to be reserved for bulk address assignment; and
selecting the first set of network addresses from the first range.

* * * * *